(12) United States Patent
Taniguchi et al.

(10) Patent No.: US 9,288,445 B2
(45) Date of Patent: Mar. 15, 2016

(54) CONTENT DELIVERY SYSTEM

(75) Inventors: Kunihiro Taniguchi, Tokyo (JP);
Kazushige Ishikawa, Tokyo (JP);
Kazuo Asami, Tokyo (JP)

(73) Assignee: NEC CORPORATION, Tokyo (JP)

( * ) Notice: Subject to any disclaimer, the term of this patent is extended or adjusted under 35 U.S.C. 154(b) by 320 days.

(21) Appl. No.: 13/063,122

(22) PCT Filed: Jul. 14, 2009

(86) PCT No.: PCT/JP2009/003285
§ 371 (c)(1),
(2), (4) Date: Mar. 9, 2011

(87) PCT Pub. No.: WO2010/029673
PCT Pub. Date: Mar. 18, 2010

(65) Prior Publication Data
US 2011/0167139 A1    Jul. 7, 2011

(30) Foreign Application Priority Data

Sep. 10, 2008    (JP) ................................. 2008-231760

(51) Int. Cl.
*G06F 15/16* (2006.01)
*H04N 7/173* (2011.01)
*G06Q 30/02* (2012.01)
(Continued)

(52) U.S. Cl.
CPC ....... *H04N 7/17318* (2013.01); *G06Q 30/0251* (2013.01); *H04N 21/25808* (2013.01); *H04N 21/472* (2013.01); *H04N 21/47202* (2013.01); *H04N 21/482* (2013.01);
(Continued)

(58) Field of Classification Search
USPC ......................................................... 709/219
See application file for complete search history.

(56) References Cited

U.S. PATENT DOCUMENTS 8,458,184 B2 * 6/2013 Dorogusker et al. ......... 707/740
8,473,628 B2 * 6/2013 Kapoor et al. ................ 709/231
(Continued)

FOREIGN PATENT DOCUMENTS

EP    1 988 666 A1    11/2008
JP    2003319363 A    11/2003
(Continued)

OTHER PUBLICATIONS

Machine translation of JP 200822298: Kawamori Mosahito Published by : Nippon Telegraph and Telephone Corp. Published on : Jan. 31, 2008.*

(Continued)

*Primary Examiner* — Kevin Bates
*Assistant Examiner* — Ronak Patel

(57) ABSTRACT

The system (1) includes an application server system (AP system) (4) and a connection control system (3). Based on equipment specification information transmitted by user equipment (2), the connection control system (3) establishes connection between the AP system (4) and the user equipment (2). The AP system (4) receives a content delivery request transmitted by the user equipment (2). The AP system (4) selects advertisement content based on advertisement selection information. The AP system (4) generates viewing content data in which the selected advertisement content is inserted in main content identified by the content delivery request. The AP system (4) transmits the generated viewing content data to the user equipment (2) if connection with the user equipment (2) is established.

13 Claims, 19 Drawing Sheets

(51) Int. Cl.
| | |
|---|---|
| *H04N 21/258* | (2011.01) |
| *H04N 21/472* | (2011.01) |
| *H04N 21/482* | (2011.01) |
| *H04N 21/61* | (2011.01) |
| *H04N 21/658* | (2011.01) |
| *H04N 21/81* | (2011.01) |
| H04N 5/76 | (2006.01) |

(52) U.S. Cl.
CPC ...... *H04N 21/6125* (2013.01); *H04N 21/6582* (2013.01); *H04N 21/812* (2013.01); *H04N 5/76* (2013.01)

(56) References Cited

U.S. PATENT DOCUMENTS

| | | | |
|---|---|---|---|
| 8,688,991 B1* | 4/2014 | Sunil | 713/176 |
| 2003/0149975 A1 | 8/2003 | Eldering et al. | |
| 2005/0060229 A1 | 3/2005 | Riedl et al. | |
| 2007/0174866 A1* | 7/2007 | Brown et al. | 725/28 |
| 2007/0223523 A1* | 9/2007 | Montpetit et al. | 370/465 |
| 2008/0256216 A1* | 10/2008 | Aarts | 709/217 |

FOREIGN PATENT DOCUMENTS

| | | |
|---|---|---|
| JP | 2004240709 A | 8/2004 |
| JP | 2005115587 A | 4/2005 |
| JP | 2008022298 A | 1/2008 |
| JP | 2008153896 A | 7/2008 |
| WO | 02/21839 A2 | 3/2002 |
| WO | 2007/093126 A1 | 8/2007 |

OTHER PUBLICATIONS

Machine translation of JP 2004240709 : Tanaka Hiroshi Published by : Nippon Telegraph and Telephone Corp. Published on : Aug. 26, 2004.*

International Search Report for PCT/JP2009/003285 mailed Aug. 11, 2009.

Oliver Friedrich et al., "Interactive and Personalized Services for an open IMS-based IPTV Infrastructure" Seventh International Confrence on Networking, 2008. ICN 2008, Apr. 13, 2008, pp. 302-307, IEEE, Piscataway, NJ, USA. Cited in EP Search Report.

DVB Organization, "Commercial Requirements for Phase 2 Content Delivery, DVB-CM IPTV group", CM-IPTV0379r4, DVB, Digital Video Broadcasting, Conference Call Content Delivery TF, Feb. 18, 2008, XP017827618.doc, pp. 1-19. Cited in EP Search Report.

Hyojin Park, "Draft Supplement: IPTV service scenarios", TD 294 (GEN/13), TD25 (IPTV-GSI), Telecommunication Standardization Sector, Study Period 2005-2008, International Telecommunication Union, Jan. 15-22, 2008, vol. Q1/13, Q2/13, Q8/13 and Q22/16, pp. 1-40. Cited in EP Search Report.

The Extended EP Search Report for EP Application No. 09 812 822.6 dated on Nov. 13, 2013.

* cited by examiner

Fig.3

| ADVERTISEMENT ATTRIBUTE INFORMATION | PRIORITY INFORMATION |
|---|---|
| CAR | 1 |
| REAL ESTATE | 2 |
| TRAVEL | 4 |
| INSURANCE | 5 |
| CELL-PHONE | 3 |
| COFFEE | 3 |
| GADGET | 4 |
| ⋮ | ⋮ |

Fig.6

```
INVITE sip:bob@biloxi.com SIP/2.0
Via: SIP/2.0/UDP
pc33.atlanta.com;branch=z9hG4bKnashds8
Max-Forwards: 70
To: Bob <sip:bob@biloxi.com>
From: Alice <sip:alice@atlanta.com>;tag=1928301774
Call-ID: a84b4c76e66710
CSeq: 314159 INVITE
X-video-sequence: adv1;0;30,content1;0;300,adv2;0;30,conte
nt1;301;600,adv3;0;30
Contact: <sip:alice@pc33.atlanta.com>
Content-Type: application/sdp
Content-Length: 142 v=0
o=jdoe 2890844526 2890842807 IN IP4 10.47.16.5
s=SDP Seminar
i=A Seminar on the session description protocol
e=j.doe@example.com (Jane Doe)
c=IN IP4 224.2.17.12/127
t=2873397496 2873404696
a=recvonly
m=application 9 TCP/TLS iptv_rtsp
a=setup:active
a=connection:new
c=IN IP4 10.10.10.10
m=audio 49170 RTP/AVP 0
c=IN IP4 10.10.10.10
b=AS:150000
a=recvonly
m=video 51372 RTP/AVP 99
c=IN IP4 10.10.10.10
b=AS:150000
a=recvonly
a=rtpmap:99 h263-1998/90000
```

PL — X-video-sequence line
HE — Header
BD — Body

Fig.7

PL — {
```
INVITE sip:content1@atlanta.com?seq=adv1+0+30+conten
t1+0+300+adv2+0+30+content1+301+600+adv3+0+30 SIP/
2.0
Via: SIP/2.0/UDP
pc33.atlanta.com;branch=z9hG4bKnashds8
Max-Forwards: 70
To: Bob <sip:bob@biloxi.com>
From: Alice <sip:alice@atlanta.com>;tag=1928301774
Call-ID: a84b4c76e66710
CSeq: 314159 INVITE
Contact: <sip:alice@pc33.atlanta.com>
Content-Type: application/sdp
Content-Length: 142 v=0
o=jdoe 2890844526 2890842807 IN IP4 10.47.16.5
s=SDP Seminar
i=A Seminar on the session description protocol
e=j.doe@example.com (Jane Doe)
c=IN IP4 224.2.17.12/127
t=2873397496 2873404696
a=recvonly
m=application 9 TCP/TLS iptv_rtsp
a=setup:active
a=connection:new
c=IN IP4 10.10.10.10
m=audio 49170 RTP/AVP 0
c=IN IP4 10.10.10.10
b=AS:150000
a=recvonly
m=video 51372 RTP/AVP 99
c=IN IP4 10.10.10.10
b=AS:150000
a=recvonly
a=rtpmap:99 h263-1998/90000
```

Fig.8

```
INVITE sip:bob@biloxi.com SIP/2.0
Via: SIP/2.0/UDP pc33.atlanta.com;branch=z9hG4bKnashds8
Max-Forwards: 70
To: Bob <sip:bob@biloxi.com>
From: Alice <sip:alice@atlanta.com>;tag=1928301774
Call-ID: a84b4c76e66710
CSeq: 314159 INVITE
Contact: <sip:alice@pc33.atlanta.com>
Content-Type: application/sdp
Content-Length: 142
```
} HE

```
v=0
o=jdoe 2890844526 2890842807 IN IP4 10.47.16.5
s=SDP Seminar
i=A Seminar on the session description protocol
a=videosequence:adv1;0;30,content1;0;300,adv2;0;30,content1;301;600,adv3;0;30
e=j.doe@example.com (Jane Doe)
c=IN IP4 224.2.17.12/127
t=2873397496 2873404696
a=recvonly
m=application 9 TCP/TLS iptv_rtsp
a=setup:active
a=connection:new
c=IN IP4 10.10.10.10
m=audio 49170 RTP/AVP 0
c=IN IP4 10.10.10.10
b=AS:150000
a=recvonly
m=video 51372 RTP/AVP 99
c=IN IP4 10.10.10.10
b=AS:150000
a=recvonly
a=rtpmap:99 h263-1998/90000
```
PL { (payload section) } BD

Fig.9

```
INVITE sip:bob@biloxi.com SIP/2.0
Via: SIP/2.0/UDP
pc33.atlanta.com;branch=z9hG4bKnashds8
Max-Forwards: 70
To: Bob <sip:bob@biloxi.com>
From: Alice <sip:alice@atlanta.com>;tag=1928301774
Call-ID: a84b4c76e66710
CSeq: 314159 INVITE
Contact: <sip:alice@pc33.atlanta.com>
Content-Type: multipart/mixed; boundary="boundary 0000"
```
} HE

```
--boundary 0000
Content-Type: aplcation/sdp
Content-Length: 142 v=0
o=jdoe 2890844526 2890842807 IN IP4 10.47.16.5
s=SDP Seminar
i=A Seminar on the session description protocol
e=j.doe@example.com (Jane Doe)
c=IN IP4 224.2.17.12/127
t=2873397496 2873404696
m=application 9 TCP/TLS iptv_rtsp
a=setup:active
a=connection:new
c=IN IP4 10.10.10.10
m=audio 49170 RTP/AVP 0
c=IN IP4 10.10.10.10
b=AS:150000
a=recvonly
m=video 51372 RTP/AVP 99
c=IN IP4 10.10.10.10
b=AS:150000
a=recvonly
a=rtpmap:99 h263-1998/90000

--boundary 0000
```
} BD1

```
Content-Type: plain/text
Content-Length: 142 adv1;0;30
content1;0;300
adv2;0;30
content1;301;600
adv3;0;30

--boundary 0000
```
} BD2

PL braces: adv1;0;30 / content1;0;300 / adv2;0;30 / content1;301;600 / adv3;0;30

Fig.10

```
INVITE sip:bob@biloxi.com SIP/2.0
Via: SIP/2.0/UDP
pc33.atlanta.com;branch=z9hG4bKnashds8
Max-Forwards: 70                                         }~HE
To: Bob <sip:bob@biloxi.com>
From: Alice <sip:alice@atlanta.com>;tag=1928301774
Call-ID: a84b4c76e66710
CSeq: 314159 INVITE
Contact: <sip:alice@pc33.atlanta.com>
Content-Type: application/sdp
Content-Length: 142 v=0
o=jdoe 2890844526 2890842807 IN IP4 10.47.16.5
s=SDP Seminar
i=A Seminar on the session description protocol
PL~{ u=http://www.example.com/seminars/playlist.xml
e=j.doe@example.com (Jane Doe)
c=IN IP4 224.2.17.12/127
t=2873397496 2873404696
a=recvonly
m=application 9 TCP/TLS iptv_rtsp
a=setup:active
a=connection:new                                         }~BD
c=IN IP4 10.10.10.10
m=audio 49170 RTP/AVP 0
c=IN IP4 10.10.10.10
b=AS:150000
a=recvonly
m=video 51372 RTP/AVP 99
c=IN IP4 10.10.10.10
b=AS:150000
a=recvonly
a=rtpmap:99 h263-1998/90000
```

Fig.15

```
INVITE sip:bob@biloxi.com SIP/2.0
Via: SIP/2.0/UDP
pc33.atlanta.com;branch=z9hG4bKnashds8
Max-Forwards: 70
To: Bob <sip:bob@biloxi.com>
From: Alice <sip:alice@atlanta.com>;tag=1928301774
Call-ID: a84b4c76e66710
CSeq: 314159 INVITE
X-user-favorite: car;1,real estate;2,travel;3,insurance;5,mobil
e phone;3,coffee;3,gadget;4
X-content-favorite: car;3,real estate;1,travel;4,insurance;5,mo
bile phone;2,coffee;1,gadget;3
Contact: <sip:alice@pc33.atlanta.com>
Content-Type: application/sdp
Content-Length: 142
```  ⎬ HE UI ⎰ (X-user-favorite lines)
CI ⎰ (X-content-favorite lines)

```
v=0
o=jdoe 2890844526 2890842807 IN IP4 10.47.16.5
s=SDP Seminar
i=A Seminar on the session description protocol
e=j.doe@example.com (Jane Doe)
c=IN IP4 224.2.17.12/127
t=2873397496 2873404696
a=recvonly
m=application 9 TCP/TLS iptv_rtsp
a=setup:active
a=connection:new
c=IN IP4 10.10.10.10
m=audio 49170 RTP/AVP 0
c=IN IP4 10.10.10.10
b=AS:150000
a=recvonly
m=video 51372 RTP/AVP 99
c=IN IP4 10.10.10.10
b=AS:150000
a=recvonly
a=rtpmap:99 h263-1998/90000
```  ⎬ BD

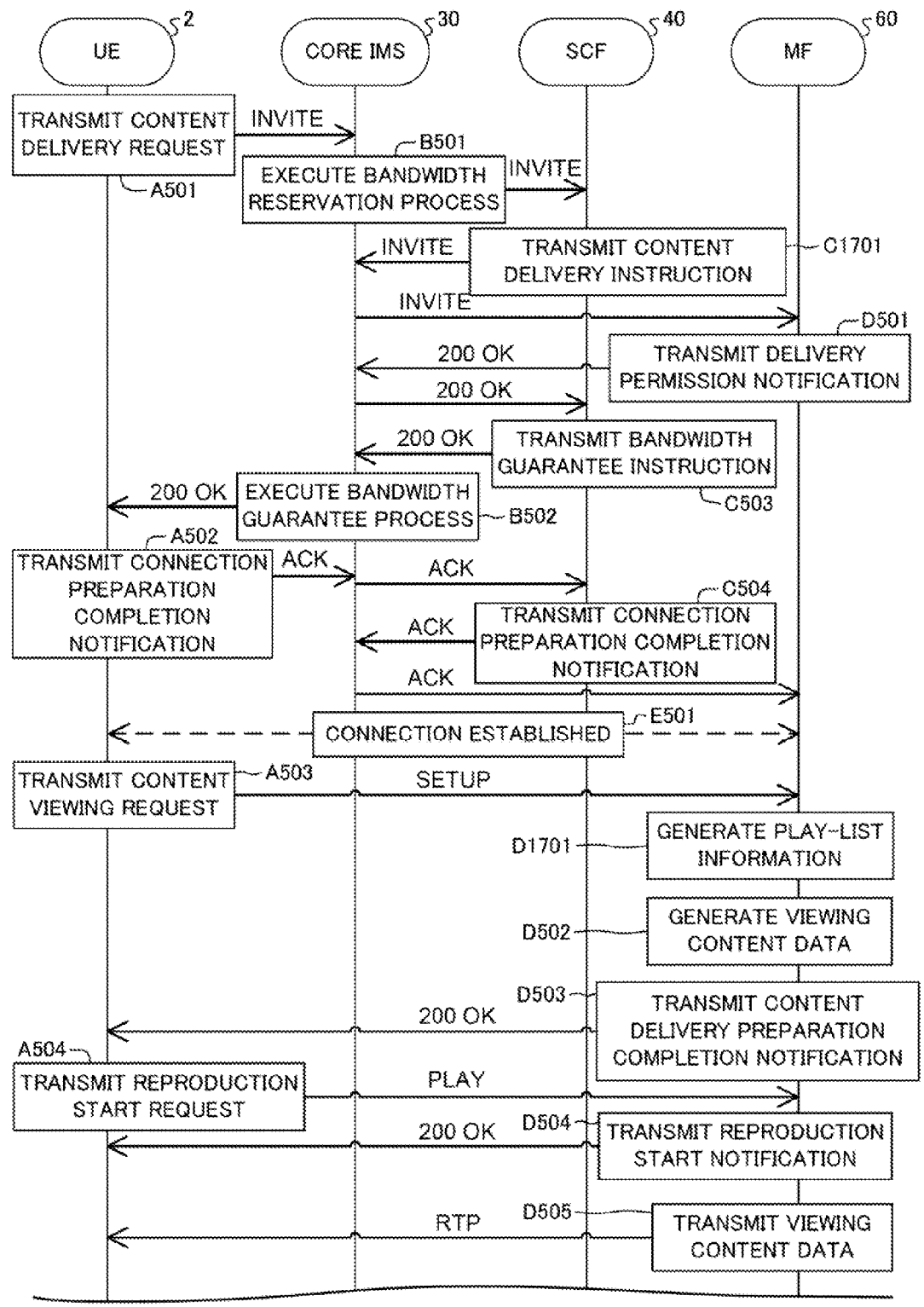

Fig.18

```
INVITE sip:bob@biloxi.com SIP/2.0
Via: SIP/2.0/UDP
pc33.atlanta.com;branch=z9hG4bKnashds8           ⎫
Max-Forwards: 70                                  |
To: Bob <sip:bob@biloxi.com>                      |
From: Alice <sip:alice@atlanta.com>;tag=1928301774|
Call-ID: a84b4c76e66710                           ⎬ HE
CSeq: 314159 INVITE                               |
AD { X-video-advertisement: adv1,adv2,adv3        |
Contact: <sip:alice@pc33.atlanta.com>             |
Content-Type: application/sdp                     |
Content-Length: 142                               ⎭ v=0                                               ⎫
o=jdoe 2890844526 2890842807 IN IP4 10.47.16.5    |
s=SDP Seminar                                     |
i=A Seminar on the session description protocol   |
e=j.doe@example.com (Jane Doe)                    |
c=IN IP4 224.2.17.12/127                          |
t=2873397496 2873404696                           |
a=recvonly                                        |
m=application 9 TCP/TLS iptv_rtsp                 |
a=setup:active                                    |
a=connection:new                                  ⎬ BD
c=IN IP4 10.10.10.10                              |
m=audio 49170 RTP/AVP 0                           |
c=IN IP4 10.10.10.10                              |
b=AS:150000                                       |
a=recvonly                                        |
m=video 51372 RTP/AVP 99                          |
c=IN IP4 10.10.10.10                              |
b=AS:150000                                       |
a=recvonly                                        |
a=rtpmap:99 h263-1998/90000                       ⎭
```

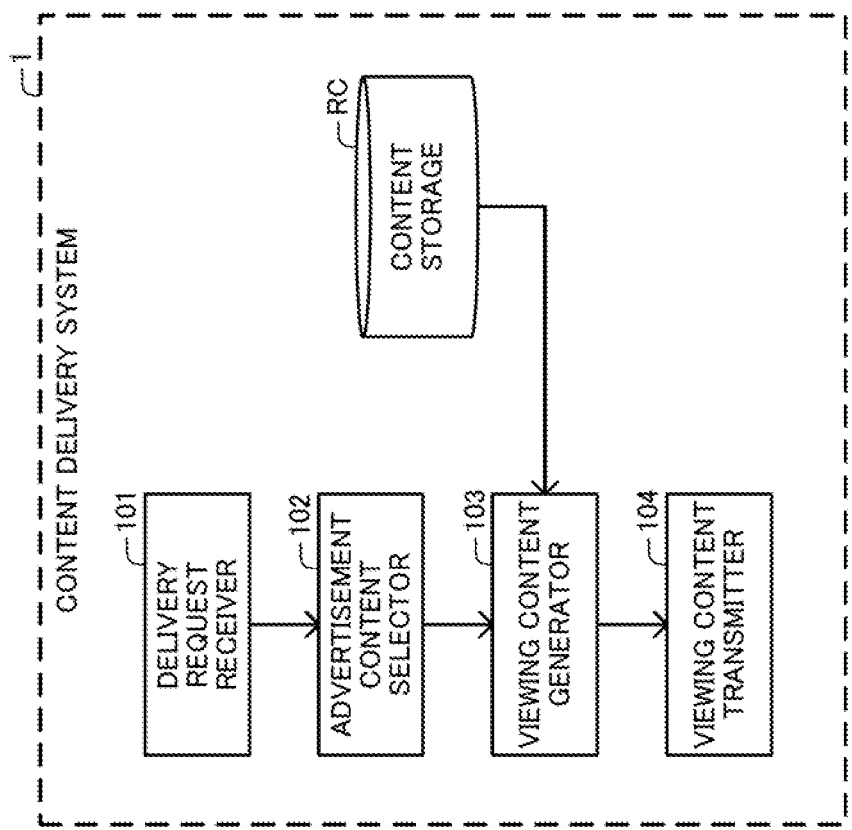

CONTENT DELIVERY SYSTEM

The present application is the National Phase of PCT/JP2009/003285, filed Jul. 14, 2009, which is based upon and claims the benefit of priority from Japanese patent application No. 2008-231760 filed Sep. 10, 2008, the disclosure of which is incorporated herein in its entirety by reference.

TECHNICAL FIELD

The present invention relates to a content delivery system transmitting content data representing content to user equipment.

BACKGROUND ART

A content delivery system is known including a content transmitter, a content receiver, and a connection controller (SIP (Session Initiation Protocol) server).

In this content delivery system, the content receiver transmits a content delivery request to the connection controller. In response to the content delivery request, the connection controller transmits a content delivery instruction to the content transmitter, while establishing a connection between the content transmitter and the content receiver. Further, the content delivery system executes a process to reserve a communication bandwidth of a communication channel between the content transmitter and the content receiver. Once the connection is established by the connection controller, the content transmitter transmits prestored content data to the content receiver.

According to this content delivery system, the communication bandwidth of the communication channel between the content transmitter and the content receiver is secured, which prevents deterioration of communication quality when the content data is transmitted from the content transmitter to the content receiver.

[Patent Document 1] JP 2008-153896A

SUMMARY

In the content delivery system described above, the content transmitter transmits prestored content data in response to a request from the content receiver.

Therefore, it is considered preferable that, in order to cause a user of the content receiver to view viewing content in which advertisement content is inserted into main content which the user desires to view (user's desired content), the content delivery system should be configured such that viewing content data representing the viewing content is previously stored in the content transmitter.

However, even if the content delivery system is configured in this manner, the content delivery system cannot change the advertisement content inserted into the main content according to the user's desired content and/or the user who views the content. This means that the aforementioned content delivery system is not able to cause a user to view the user's desired content and/or advertisement content selected according to the user.

It is therefore an object of the present invention to provide a content delivery system capable of solving the problem that it is impossible to cause a user to view the user's desired content and/or advertisement content selected according to the user.

In order to achieve the object as described above, an aspect of the present invention provides a content delivery system including an application server system and a connection control system.

Further, the connection control system is configured to receive equipment specification information transmitted by user equipment and establish connection between the application server system and the user equipment based on the received equipment specification information.

The application server system includes: content storage means for storing advertisement content data representing advertisement content and main content data representing main content; delivery request reception means for receiving, via the connection control system, a content delivery request transmitted by the user equipment and containing main content identification information for identifying the main content; advertisement content selection means for selecting the stored advertisement content data based on advertisement selection information containing advertisement attribute information representing attributes of the advertisement content; viewing content generation means for generating, based on the selected advertisement content data and the main content data identified by the received content delivery request, viewing content data representing viewing content in which advertisement content represented by the advertisement content data is inserted in main content represented by the main content data; and viewing content delivery means for transmitting the generated viewing content data to the user equipment if connection with the user equipment which has transmitted the content delivery request is established by the connection control system.

Another aspect of the present invention provides a content delivery system also including an application server system and a connection control system.

The connection control system further includes a core IMS (Internet Protocol Multimedia Subsystem) part which is configured to receive equipment specification information transmitted by user equipment and establish connection between the application server system and the user equipment based on the received equipment specification information.

The application server system includes: a media functions part for transmitting content data representing content to the user equipment with which the connection is established by the connection control system; a service control functions part for controlling services provided by the media functions part; and a user profile server functions part for storing profile information of a user of the user equipment. The application server system further includes: content storage means for storing advertisement content data representing advertisement content and main content data representing main content; and advertisement content selection means for selecting the stored advertisement content data based on advertisement selection information containing advertisement attribute information representing attributes of the advertisement content and preliminarily stored by the user profile server functions part, the service control functions part or the connection control system.

Further, the service control functions part includes delivery request reception means for receiving, via the core IMS part, a content delivery request containing main content identification information for identifying the main content and transmitted by the user equipment.

In addition, the media functions part includes: viewing content generation means for generating, based on the selected advertisement content data and main content data identified by the received content delivery request, viewing content data representing viewing content in which advertisement content represented by the advertisement content data is inserted in main content represented by the main content data; and viewing content delivery means for transmitting the generated viewing content data to the user equipment if connection with the user equipment which has transmitted the content delivery request is established by the core IMS part.

Another aspect of the present invention provides a content delivery method comprising: receiving equipment specification information transmitted by user equipment and establishing connection between an application server system and the user equipment based on the received equipment specification information, by a connection control system; storing advertisement content data representing advertisement content and main content data representing main content in a storing device; receiving, via the connection control system, a content delivery request containing main content identification information for identifying the main content and transmitted by the user equipment, by the application server system; selecting the stored advertisement content data based on advertisement selection information containing advertisement attribute information representing attributes of the advertisement content; generating, based on the selected advertisement content data and the main content data identified by the received content delivery request, viewing content data representing viewing content in which advertisement content represented by the advertisement content data is inserted in main content represented by the main content data; and transmitting the generated viewing content data to the user equipment if connection with the user equipment which has transmitted the content delivery request is established by the connection control system, by the application server system.

Still another aspect of the present invention provides a computer program comprising instructions for causing a service control server to realize: delivery request reception means for receiving a content delivery request containing main content identification information for identifying main content and transmitted by user equipment, via a connection control system establishing connection between a media server and the user equipment; advertisement content selection means for selecting advertisement content data preliminarily stored in a storing device based on advertisement selection information containing advertisement attribute information representing attributes of advertisement content; and selected advertisement content specification information transmission means for transmitting selected advertisement content specification information specifying the advertisement content data selected by the advertisement content selection means to the media server via the connection control system when the connection control system executes a process for establishing the connection.

Still another aspect of the present invention provides a computer program comprising instructions to cause a service control server to realize: delivery request reception means for receiving a content delivery request containing main content identification information for identifying main content and transmitted by user equipment, via a connection control system establishing connection between a media server and the user equipment; and advertisement selection information transmission means for transmitting advertisement selection information containing advertisement attribute information representing attributes of advertisement content to the media server via the connection control system when the connection control system executes a process for establishing the connection.

The present invention configured as described above is capable of causing a user to view the user's desired content and/or advertisement content selected according to the user.

BRIEF DESCRIPTION OF THE DRAWINGS

FIG. 3 is a table illustrating user basic information stored in the user information management server shown in FIG. 1;

FIG. 6 is a diagram showing an INVITE message containing a content delivery instruction;

FIG. 7 is a diagram showing an INVITE message containing a content delivery instruction according to a modification of the first embodiment;

FIG. 8 is a diagram showing an INVITE message containing a content delivery instruction according to a modification of the first embodiment;

FIG. 9 is a diagram showing an INVITE message containing a content delivery instruction according to a modification of the first embodiment;

FIG. 10 is a diagram showing an INVITE message containing a content delivery instruction according to a modification of the first embodiment;

FIG. 15 is a diagram showing an INVITE message containing a content delivery instruction according to the second embodiment of the present invention;

FIG. 17 is a sequence diagram illustrating operation performed by the content delivery system according to the third embodiment of the present invention when transmitting viewing content data to the user equipment in response to an input of the user of the user equipment;

FIG. 18 is a diagram showing an INVITE message containing a content delivery instruction according to the third embodiment of the present invention; and FIG. 19 is a block diagram schematically illustrating functions of a content delivery system according to a fourth embodiment of the present invention.

EXEMPLARY EMBODIMENTS

Exemplary preferred embodiments of a content delivery system, a content delivery method, and a program according to the present invention will be described with reference to FIGS. 1 to 19.

First Embodiment

Configuration

Figure 1:
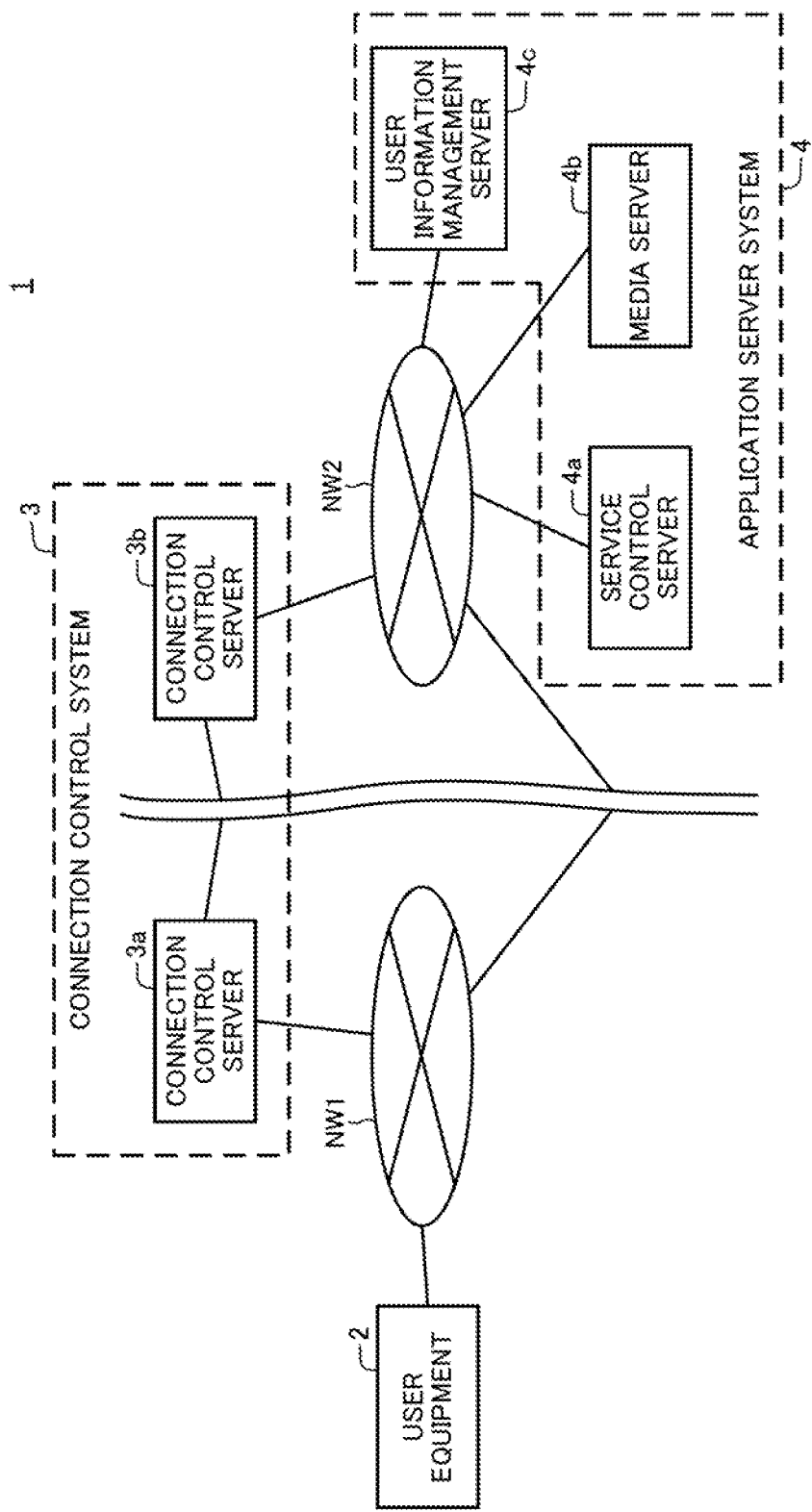
FIG. 1 is a diagram illustrating a schematic configuration of a content delivery system according to a first embodiment of the present invention.

As illustrated in FIG. 1, a content delivery system 1 according to a first embodiment is a Video-on-Demand system. Alternatively, the content delivery system 1 may be an IPTV (Internet Protocol Television) system for broadcasting content.

The content delivery system 1 includes a connection control system 3 and an application server system 4. The connection control system 3 includes a plurality of servers including a connection control server 3a and a connection control server 3b. The application server system 4 includes a plurality of servers including a service control server 4a, a media server 4b, and a user information management server 4c.

The connection control server 3a is communicably connected to user equipment (UE) 2 through user communication lines NW1 forming an IP (Internet Protocol) network. The connection control server 3b and the application server system 4 are communicably connected to each other through service provider communication lines NW2 forming the IP network.

The user equipment 2 has a set-top box and a remote controller (both not shown). The set-top box is connected to a television receiver (not shown). The set-top box receives content data representing content transmitted from the media server 4b (here, the content is a video consisting of sound and images), and outputs the content to the television receiver by converting the received content data.

The remote controller has a plurality of buttons (button switches). When a button is pressed by a user, the remote controller transmits an infrared signal corresponding to the pressed button to the set-top box. The set-top box accepts information input by the user by receiving the infrared signal from the remote controller.

The user equipment 2 stores equipment specification information for specifying the equipment (local terminal) in a memory serving as a storing device.

The connection control server 3a, the connection control server 3b, the service control server 4a, the media server 4b, and the user information management server 4c (servers 3a to 4c) each have a central processing unit (CPU) (not shown), and a storing device (memory and hard disk drive (HDD)) (not shown). Each of the servers 3a to 4c is configured to realize functions described below by the CPU executing a program stored in the storing device.

The connection control server 3a and the connection control server 3b are configured to control connection between a plurality of devices by exchanging (receiving and transmitting) a SIP message (message according to Session Initiation Protocol). In other words, each of the connection control server 3a and the connection control server 3b is a SIP server.

The connection control system 3 is configured to establish, upon receiving a SIP message containing equipment specification information transmitted by the user equipment 2, connection (session) between the application server system 4 and the user equipment 2 based on the equipment specification information contained in the received SIP message.

The service control server 4a controls a service provided by the media server 4b (service to transmit content data). The media server 4b transmits content data representing content to the user equipment 2 with which the connection is established by the connection control system 3. The user information management server 4c preliminarily stores profile information of the user of the user equipment 2, and transmits the stored profile information to the service control server 4a.

(Functions)

Figure 2:
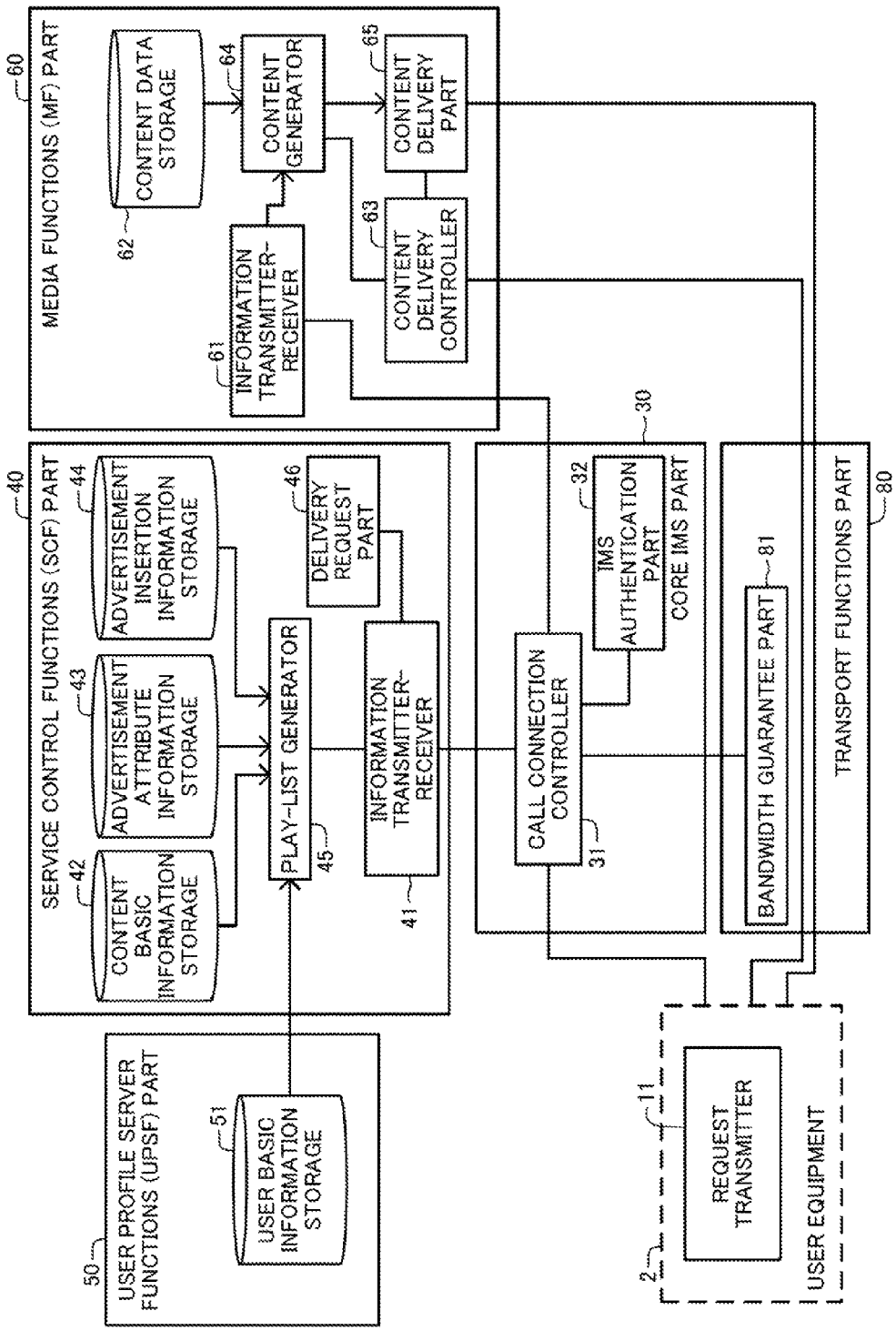
FIG. 2 is a block diagram schematically illustrating functions of the content delivery system shown in FIG. 1.

FIG. 2 is a block diagram illustrating functions of the content delivery system 1 configured as described above.

(Functions of User Equipment)

Functions of the user equipment 2 include a request transmitter 11. The request transmitter 11 transmits, to the connection control server 3a, a SIP message as an equipment authentication request containing the stored equipment specification information, when the state of a power switch of the user equipment 2 is set to ON state (when power is supplied).

The request transmitter 11 receives a SIP message containing equipment authentication success information from the connection control system 3. The equipment authentication success information is information containing equipment address information representing a position of the equipment in the IP network, and indicating that the user equipment 2 located at the position represented by the equipment address information is authenticated to be valid equipment.

Further, the request transmitter 11 transmits, to the connection control system 3, a SIP message containing user authentication information received from the user of the user equipment 2 via the remote controller, as a user authentication request. In this example, the user authentication information consists of user identification information representing a character string for identifying the user of the user equipment 2, and password information representing a character string as a password.

The request transmitter 11 also receives a SIP message containing user authentication success information from the connection control system 3. The user authentication success information is information containing user identification information, and indicating that the user identified by the user identification information (i.e., the user who has input the user authentication information) is a valid user.

Upon receiving the user authentication success information from the connection control system 3, the request transmitter 11 transmits to the connection control system 3 a SIP message containing a process request for requesting the application server system to execute the process, in response to a request delivery instruction input by the user of the user equipment 2. The process request contains user authentication success information (i.e., user identification information).

(Functions of Connection Control System)

Functions of the connection control system 3 include a core IMS (Internet Protocol Multimedia Subsystem) part 30 and a transport functions part 80.

The core IMS part 30 includes a call connection controller 31 and an IMS authentication part (user authentication means) 32. The call connection controller 31 controls connection between a plurality of devices by exchanging (receiving and transmitting) a SIP message.

When the connection control server 3a receives an equipment authentication request from the user equipment 2, the IMS authentication part 32 authenticates whether or not the user equipment 2 is a valid equipment (executes an equipment authentication) by determining whether or not the equipment specification, information contained in the received equipment authentication request corresponds to (coincides with, in this example) equipment authentication reference information. The equipment authentication reference information as used herein is information that is preliminarily stored in a storing device (user profile server functions part 50 to be described later) provided in the user information management server 4c.

When the user equipment 2 is authenticated to be a valid equipment by the IMS authentication part 32, the call connection controller 31 subsequently executes a process based on the message (process request or the like) transmitted from the user equipment 2 (for example, a process to transfer the message to the application server system 4). In this case, the call connection controller 31 further transmits a SIP message containing equipment authentication success information to the user equipment 2.

On the other hand, if the user equipment 2 is not authenticated to be valid equipment by the IMS authentication part 32, the call connection controller 31 does not execute the process based on the message (process request or the like) transmitted from the user equipment 2 from then onward.

Further, when the connection control server 3a receives a user authentication request from the user equipment 2, the IMS authentication part 32 authenticates whether or not the user who has input the user authentication information (the user identified by the user identification information contained in the user authentication information) is a valid user (whether or not the user identified by the user identification information coincides with the user of the user equipment 2) by determining whether or not the user authentication information contained in the user authentication request corresponds to user authentication reference information (executes user authentication). The user authentication reference information as used herein is information that is preliminarily stored in the storing device (user profile server functions part 50 to be described later) provided in the user information management server 4c. This means that the user profile server functions part 50 constitutes user authentication reference information storage means.

When the user who has input the user authentication information is authenticated to be a valid user by the IMS authentication part 32, the call connection controller 31 transmits a SIP message containing user authentication success information to the user equipment 2. However, if the user who has input the user authentication information is not authenticated to be a valid user by the IMS authentication part 32, the call connection controller 31 does not transmit a SIP message containing user authentication success information to the user equipment 2.

Upon receiving a bandwidth guarantee instruction from the service control server 4a, the call connection controller 31 establishes connection between the media server 4b and the user equipment 2. The bandwidth guarantee instruction contains media delivery specification information for specifying the media server 4b, and communication bandwidth information representing a communication bandwidth. The call connection controller 31 transmits, to the transport functions part 80, the received communication bandwidth information and communication channel specification information for specifying a communication channel between the user equipment 2 and the media server 4b specified by the received media delivery specification information.

The transport functions part 80 includes a bandwidth guarantee part 81. The bandwidth guarantee part 81 receives the communication bandwidth information and the communication channel specification information from the call connection controller 31, and executes a process to guarantee a communication bandwidth represented by the communication bandwidth information for a communication channel specified by the received communication channel specification information (bandwidth guarantee process).

(Functions of User Information Management Server)

Functions of the user information management, server 4c include a user profile server functions (UPSF) part 50.

The user profile server functions part 50 stores profile information of the user of the user equipment 2. The user profile server functions part 50 includes a user basic information storage 51.

The user basic information storage 51 stores user basic information in association with the user identification information for identifying the user of the user equipment 2. The user basic information is information for specifying advertisement attribute information representing attributes of advertisement content (in this example, categories of advertisement content such as cars, real estate, travel, insurance, cell-phones, coffee, gadgets and so on). In this example, the user basic information contains, as shown in FIG. 3, a plurality of information sets consisting of advertisement attribute information and priority information representing priority levels (in this example, indicated by integer values which increase as the priority level rises). The user basic information forms part of advertisement selection information.

(Functions of Service Control Server)

Functions of the service control server 4a include a service control functions (SCF) part 40.

The service control functions part 40 includes an information transmitter-receiver (delivery request reception, means and selected advertisement content specification information transmission means) 41, a content basic information storage 42, an advertisement attribute information storage (part of content storage means, or part of a content storing processing step) 43, an advertisement insertion information storage 44, a play-list generator (advertisement content selection means) 45, and a delivery request part 46.

The information transmitter-receiver receives various information (request, instruction, notification, and so on) transmitted by the user equipment 2 or the media server 4b via the core IMS part 30 (routed through the core IMS part 30). Further, the information transmitter-receiver 41 transmits various information to the user equipment 2 or the media server 4b via the core IMS part 30. In this example, the various information is contained in the SIP message.

Only when the service control server 4a receives a process request containing user authentication success information from the user equipment 2, the service control server 4a executes a process according to the process request. Thus, it can be said that the application server system 4 executes a process according to the process request when the user who has input the user authentication information is authenticated to be a valid user by the IMS authentication part 32.

The content basic information storage 42 stores the content basic information in association with main content identification information for identifying the main content. The content basic information is information for specifying advertisement attribute information. In this example, like the user basic information, the content basic information includes a plurality of information sets consisting of advertisement attribute information and priority information representing priority levels. The content basic information forms part of the advertisement selection information.

The advertisement attribute information storage 43 stores advertisement content identification information for identifying advertisement content in association with the advertisement attribute information.

The advertisement insertion information storage 44 stores the main content identification information, number-of-insertions information, and inserting position information in association with each other. The number-of-insertions information is information representing a number of insertions that is a number of items of advertisement content inserted in the main content. The inserting position information is information representing an inserting position that is a position in the main content where the advertisement content is to be inserted (in this example, it is indicated by a play time from the beginning of the main content).

The play-list generator 45 accepts a content delivery request received by the information transmitter-receiver 41 as a process request. The content delivery request is information transmitted by the user equipment 2 and containing user authentication success information (i.e., user identification information), equipment address information, and main content identification information.

The play-list generator 45 acquires, from the user basic information stored in the user basic information storage 51, user basic information stored in association with the user identification information contained in the content delivery request received by the information transmitter-receiver 41.

Further, the a play-list generator 45 acquires, from the content basic information stored in the content basic information storage 42, content basic information stored in association with the main content identification information contained in the content delivery request.

The play-list generator 45 then calculates a final priority level for each item of the advertisement attribute information by combining a priority level represented by the priority information contained in the acquired user basic information and a priority level represented by the priority information contained in the acquired content basic information for each item of the advertisement attribute information.

Subsequently, the play-list generator 45 extracts, from the advertisement content identification information stored in the advertisement attribute information storage 43, advertisement content identification information associated with the item of advertisement attribute information the calculated final priority level of which is the highest.

On the other hand, the play-list generator 45 acquires, from the number-of-insertions information and the insertion position information stored in the advertisement insertion information storage 44, number-of-insertions information and insertion position information stored in association with the main content identification information contained in the content delivery request.

The play-list generator 45 then selects, from the extracted advertisement content identification information, a number of items of advertisement content identification information, the number being that represented by the acquired number-of-insertions information.

Thus, it can be said that the play-list generator 45 selects advertisement content data stored in association with the advertisement attribute information specified on the basis of the user basic information associated with the user identification information for identifying the user of the user equipment 2 which has transmitted the content delivery request, and the content basic information associated with the main content identification information contained in the content delivery request.

Subsequently, the play-list generator 45 generates play-list information on the basis of the selected advertisement content identification information, the main content identification information contained in the content delivery request, and the acquired insertion position information.

In this example, the play-list information contains a plurality of sets of content element information each consisting of content identification information (main content identification information or advertisement content identification information), and information on a reproduction (play) start position and reproduction end position of the content identified by the content identification information. In other words, the play-list information is information containing the main content identification information contained in the content delivery request and the selected advertisement content specification information specifying the advertisement content data selected by the play-list generator 45. Further, the play-list information is information containing information indicating a sequence in which the main content identified by the main content identification information and the advertisement content specified by the selected advertisement content specification information are arranged in the viewing content.

The delivery request part 46 outputs a content delivery instruction. The content delivery instruction contains the play-list information generated by the play-list generator 45, the user authentication success information contained in the content delivery request (i.e., user identification information), the equipment address information, and the main content identification information.

The information transmitter-receiver 41 transmits the content delivery instruction output by the delivery request part 46 to the media server 4b via the core IMS part 30.

(Functions of Media Server)

Functions of the media server 4b include a media functions (MF) part 60. The media functions part 60 includes a media control functions (MCF) part and a media delivery functions (MDF) part.

The media functions part 60 includes an information transmitter-receiver (selected advertisement content specification information reception means) 61, a content data storage (part of content storage means, and part of a content storing processing step) 62, a content delivery controller 63, a content generator (viewing content generation means) 64, and a content delivery part (viewing content delivery means) 65.

The information transmitter-receiver 61 receives various information transmitted by the service control server 4a via the core IMS part 30. Specifically, the information transmitter-receiver 61 receives a content delivery instruction and so on transmitted by the service control server 4a via the core IMS part 30. The information transmitter-receiver 61 transmits the various information to the service control server 4a via the core IMS part 30.

The content data storage 62 stores main content data representing main content and main content identification information for identifying the main content in association with each other. Further, the content data storage 62 stores advertisement content data representing advertisement content and advertisement content identification information for identifying the advertisement content in association with each other.

The content delivery controller 63 receives a content viewing request from the user equipment 2. The content viewing request contains main content identification information and user identification information. The content delivery controller 63 also receives a reproduction start request from the user equipment 2. The reproduction start request is information representing a request for starting transmission of the content data.

The content generator 64 acquires, from the content delivery instruction received by the information transmitter-receiver 61, play-list information contained in the content delivery instruction containing the main content identification information and the user identification information contained in the content viewing request received by the content delivery controller 63.

The content generator 64 then generates viewing content data based on the acquired play-list information, and the advertisement content data and main content data stored in the content data storage 62.

Specifically, the content generator 64 extracts, from the content data (main content data or advertisement content data) stored in the content data storage 62 in association with the content identification information forming the content element information contained in the acquired play-list information, the part of the content data corresponding to the content element information of from the reproduction start position to the reproduction end position, as content element data, for each item of the content element information.

The content generator 64 generates viewing content data by combining the extracted content element data together. In other words, the content generator 64 generates the viewing content data based on the main content data and advertisement content data specified by the play-list information.

In this manner, the content generator 64 is capable of generating the viewing content data representing the viewing content in which the advertisement content is inserted in the main content.

Once a reproduction start request is received by the content delivery controller 6, the content delivery part 65 transmits the viewing content data generated by the content generator 64 to the user equipment 2. The content delivery part 65 transmits the data using a session established by the core IMS part 30, according to a predetermined communication protocol (in this example, RTP (Real-time Transport Protocol)).

Thus, it can be said that the content delivery part 65 transmits viewing content data generated by the content generator 64 to the user equipment 2 which has transmitted the content delivery request if the connection between the user equipment 2 and the media server 4b is established by the connection control system 3.

(Operation)

Next, operation of the aforementioned content delivery system 1 will be described.

(Authentication Operation)

Figure 4:
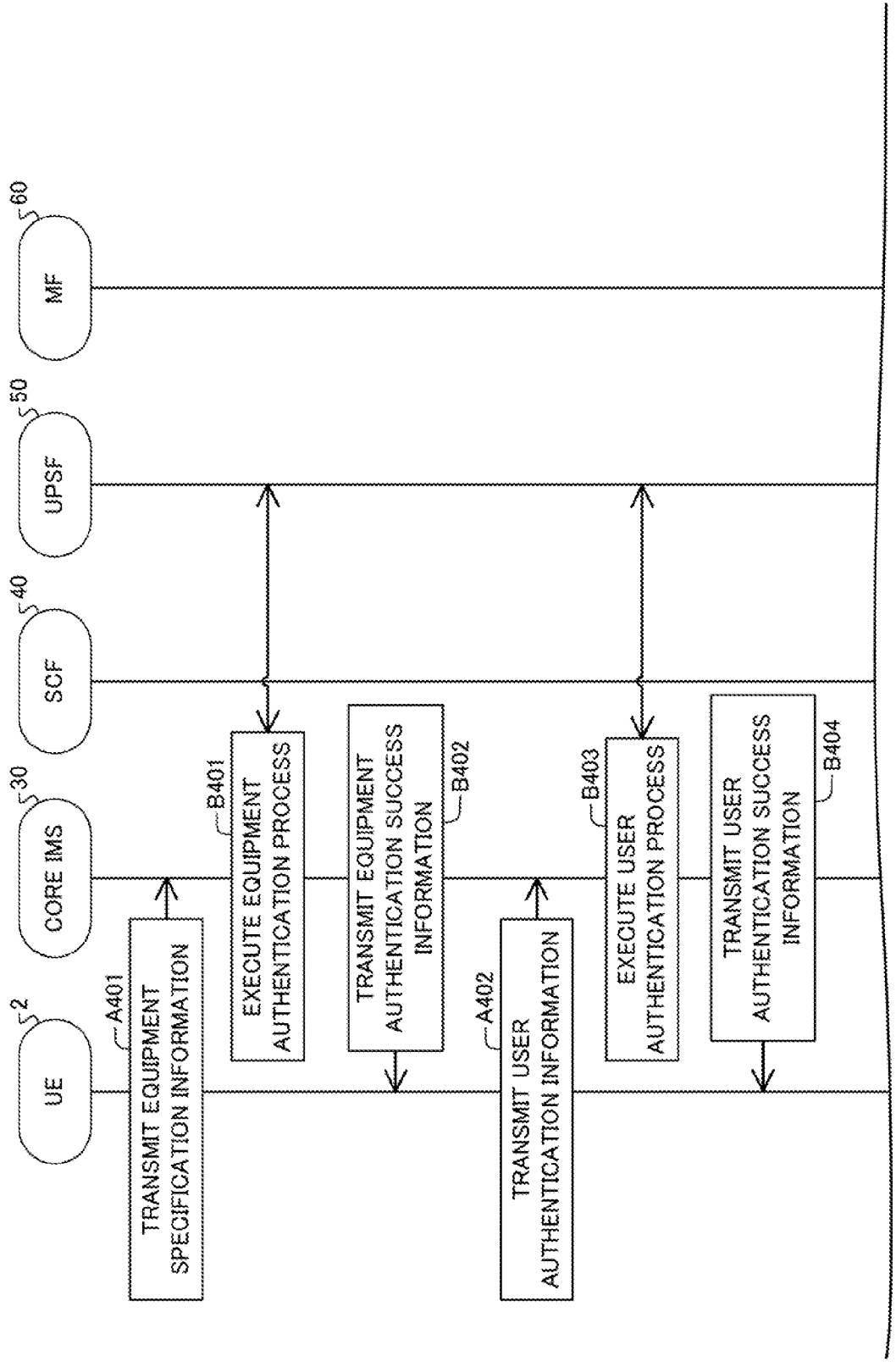
FIG. 4 is a sequence diagram illustrating operation performed by the content delivery system shown in FIG. 1 when authenticating user equipment or a user of the user equipment.

Operation of the content delivery system 1 when the content delivery system 1 authenticates the user of the user equipment 2 will be described with reference to the sequence diagram of FIG. 4.

Firstly, power is supplied to the user equipment 2 by the user setting the state of the power switch of the equipment 2 to ON state. This causes the user equipment 2 to transmit an equipment authentication request containing the stored equipment specification information to the connection control server 3a (core IMS part 30) (step A401).

The core IMS part 30 authenticates whether or not the user equipment 2 is valid equipment (executes an equipment authentication process) by determining whether or not the equipment specification information contained in the received equipment authentication request corresponds to (in this example, coincides with) the preliminarily stored equipment authentication reference information (step B401). If the user equipment 2 is authenticated to be valid equipment, the core IMS part 30 then transmits equipment authentication success information to the user equipment 2 (step B402). The equipment authentication success information is information containing equipment address information and representing that the user equipment 2 is authenticated to be valid equipment.

Upon receiving the equipment authentication success information, the user equipment 2 causes a television receiver (not shown) to display an image to prompt the user UA to input user authentication information. In response to this, the user UA inputs the user authentication information by manipulating a remote controller.

Upon accepting the input of the user authentication information, the user equipment 2 transmits a user authentication request containing the accepted user authentication information to the core IMS part 30 (step A402).

Thus, the core IMS part 30 receives the user authentication request. The core IMS part 30 determines whether or not the user authentication information contained in the received user authentication request corresponds to (in this example, coincides with) the preliminarily stored user authentication reference information, whereby it is authenticated whether or not the user identified by the user identification information contained in the user authentication reference information (the user who has input the user authentication information) is a valid user (executes a user authentication process) by (step B403, user authentication). If the user who has input the user authentication information is authenticated to be a valid user, the core IMS part 30 transmits user authentication success information to the user equipment 2 (step B404).

Thus, the user equipment 2 receives the user authentication success information. After that, the user equipment 2 transmits a process request (a SIP message containing the same) containing the user authentication success information to the core IMS part 30.

(Operation of Content Viewing Process)

Figure 5:
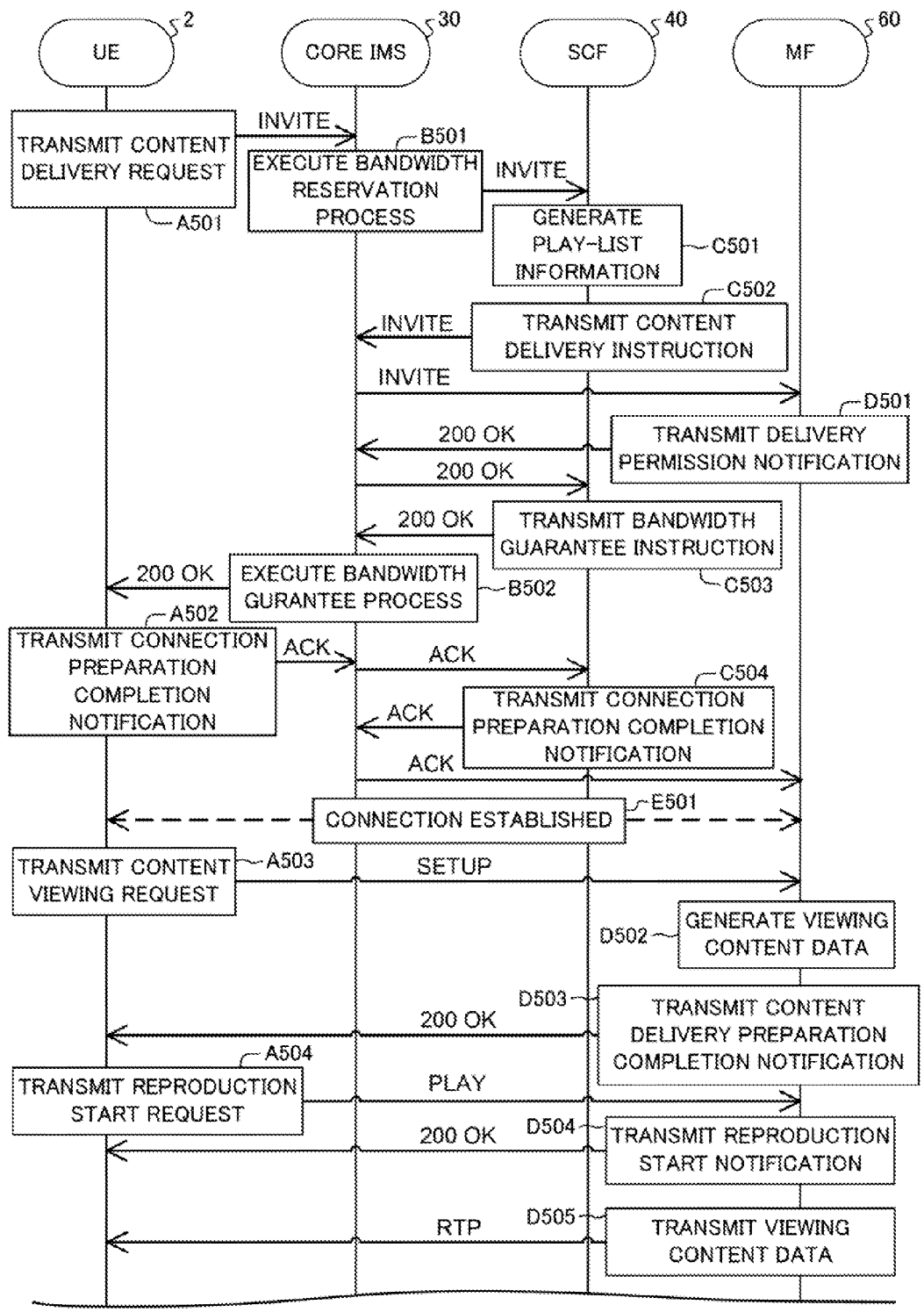
FIG. 5 is a sequence diagram illustrating operation performed by the content delivery system shown in FIG. 1 when transmitting viewing content data to the user equipment in response to an input of the user of the user equipment.

Next, operation of the content delivery system 1 when transmitting content data to the user equipment 2 in response to an input by a user of the user equipment 2 will be described with reference to the sequence diagram of FIG. 5.

Firstly, the user of the user equipment 2 inputs to the user equipment 2 information for instructing the user equipment to transmit a process request requesting transmission of content list information representing a list of viewable content. In response to this, the user equipment 2 transmits the process request to the service control server 4a (service control functions part 40) via the core IMS part 30.

The service control functions part 40 transmits content list information representing a list of main content represented by the main content data stored in the content data storage 62 to the user equipment 2 via the core IMS part 30. Upon receiving the content list information, the user equipment 2 causes a television receiver (not shown) to display the list of the main content represented by the received content list information.

The content delivery system 1 may be configured such that the content list information is transmitted to the user equipment 2 from a portable server (not shown) which is configured to be communicable with the user equipment 2 according to HTTP (Hypertext Transfer Protocol).

With the list of main content being displayed on the television receiver, the user of the user equipment 2 selects main content that the user wishes to view, and inputs main content identification information for identifying the selected main content.

Thus, the user equipment 2 transmits to the core IMS part 30 a content delivery request as a process request containing the input main content identification information, user authentication success information as the user identification information for identifying the user, and equipment address information (step A501). The content delivery request is transmitted as an INVITE message (message in which "INVITE" is set as the method) of a SIP message.

The core IMS part 30 thus receives the content delivery request. Subsequently, the core IMS part 30 executes a bandwidth reservation process as preparation for guaranteeing a communication bandwidth. The core IMS part 30 then transmits the received content delivery request to the service control functions part 40 (step B501).

Subsequently, the service control functions part 40 receives the content delivery request (delivery request reception step). The service control functions part 40 acquires user basic information and content basic information on the basis of the user identification information and main content identification information contained in the received content delivery request.

The service control functions part 40 then calculates a final priority level for each item of the advertisement attribute information based on the acquired user basic information and the acquired content basic information. The service control functions part 40 extracts from the advertisement content identification information stored in the advertisement attribute information storage 43, advertisement content identification information associated with the item of advertisement attribute information the calculated final priority level of which is the highest.

On the other hand, the service control functions part 40 acquires, from the number-of-insertions information and the insertion position information stored in the advertisement insertion information storage 44, number-of-insertions information and insertion position information stored in association with the main content identification information contained in the content delivery request.

The service control functions part 40 then selects from the extracted advertisement content identification information, a number of items of advertisement content identification information, the number being that represented by the acquired number-of-insertions information (advertisement content selection step). Subsequently, the service control functions part 40 generates play-list information on the basis of the selected advertisement content identification information, the main content identification information contained in the content delivery request, and the acquired insertion position information (step C501). The play-list information is information containing the main content identification information and the selected advertisement content specification information.

The service control functions part 40 then selects a media server 4b (media functions part 60), and transmit the content delivery instruction to the selected media functions part 60 via the core IMS part 30 (step C502, selected advertisement content specification information transmission step). The content delivery instruction contains the generated play-list information, the user identification information, and the equipment address information.

The content delivery instruction is transmitted as an INVITE message of a SIP message. As shown in FIG. 6, the INVITE message includes a header HD and a body BD. In this example, the play-list information PL is contained as values in the field of "X-video-sequence" in the header HD of the INVITE message.

In this example, the play-list information PL includes five portions of content element information separated with commas. The first portion of the content element information is formed of a set of values separated with semicolons and consisting "adv1" as the advertisement content identification information, "0" as the reproduction start position of the advertisement content, and "30" as the reproduction end position of the advertisement content. The second portion of the content element information is formed of a set of values separated with semicolons and consisting of "content1" as the main content identification information, "0" as the reproduction start position of the main content, and "300" as the reproduction end position of the main content. The third to fifth portions of the content element information are formed in the same manner as the first and second portions of the content element information.

This INVITE message is one of connection establishment messages to be exchanged by the core IMS part 30 with the user equipment 2, the service control functions part 40 and the media functions part 60 so that the core IMS part 30 establishes the connection between the user equipment 2 and the media functions part 60.

Thus, it can be said that the service control functions part 40 transmits the selected advertisement content specification information to the media functions part 60 (media server 4b) via the core IMS part 30 by incorporating the selected advertisement content specification information in the connection establishment message.

In other words, it can be said that the service control functions part 40 transmits the play-list information containing the selected advertisement content specification information to the media server 4b via the core IMS part 30 when the core IMS part 30 executes a process for establishing connection between the user equipment 2 and the media functions part 60.

The media functions part 60 thus receives the content delivery instruction (selected advertisement content specification information reception step). Subsequently, the media functions part 60 determines a media server to which the content data is to be transmitted on the basis of the main content identification information and the equipment address information contained in the content delivery instruction. Further, the media functions part 60 transmits a delivery permission notification to the service control functions part 40 via the core IMS part 30 (step D501).

The delivery permission notification contains media delivery specification information for specifying the determined media server (in this example, the media server 4b), and the main content identification information. The delivery permission notification is transmitted as an OK message (response containing "OK" and "200" as a status code in the start line) of a SIP message.

Thus, the service control functions part 40 receives the media delivery specification information and the main content identification information. The service control functions part 40 then determines a communication bandwidth required for transmitting the main content data identified by the main content identification information, on the basis of the received media delivery specification information and main content identification information.

Further, the service control functions part 40 transmits, to the core IMS part 30, a bandwidth guarantee instruction containing communication bandwidth information representing the determined communication bandwidth, and the received media delivery specification information and main content identification information (step C503). The bandwidth guarantee instruction is transmitted as an OK message of a SIP message.

Upon receiving the bandwidth guarantee instruction, the core IMS part 30 transmits, to the transport functions part 80, the received communication bandwidth information and communication channel specification information for specifying a communication channel between the user equipment 2 and the media server 4b specified by the received media delivery specification information. Thus, the transport functions part 80 executes a process to guarantee the communication bandwidth represented by the received communication bandwidth information on the communication channel specified by the received communication channel specification information (bandwidth guarantee process).

Upon completing the bandwidth guarantee process, the core IMS part 30 transmits a delivery preparation completion notification to the user equipment 2 (step B502). The delivery preparation completion notification contains the received media delivery specification information and content identification information. The delivery preparation completion notification is transmitted as an OK message of a SIP message.

Upon receiving the delivery preparation completion notification, the user equipment 2 transmits a connection preparation completion notification to the service control functions part 40 via the core IMS part 30 (step A502). The connection preparation completion notification is transmitted as an ACK message (message in which "ACK" is set as the method) of a SIP message.

Upon receiving the connection preparation completion notification, the service control functions part 40 transmits a connection preparation completion notification that is the same as the received connection preparation completion notification to the media functions part 60 via the core IMS part 30 (step C504). This connection preparation completion notification is also transmitted as an ACK message of a SIP message.

The connection (session) between the media server 4b and the user equipment 2 is established by the media functions part 60 receiving the connection preparation completion notification (step E501). The processes in step A501 to step E501 together make up a connection establishment step. It can be said that the core IMS part 30 establishes the connection between the media server 4b (media functions part 60) and the user equipment 2 by relaying the SIP message.

It can also be said that the SIP message which the connection control system 3 (core IMS part 30) exchanges with the user equipment 2, the service control server 4a and the media server 4b in step A501 to step E501 is a connection establishment message for the connection control system 3 establishing connection between the user equipment 2 and the media server 4b.

In this example, both of the connection for performing communication according to RTSP (Real Time Streaming Protocol) and the connection for performing communication according to RTP are established simultaneously.

Then, the user equipment 2 transmits a content viewing request to the media server 4b (media functions part 60) specified by the media delivery specification information contained in the received delivery preparation completion notification (step A503).

The content viewing request contains the main content identification information contained in the delivery preparation completion notification and the user identification information for identifying the user of the user equipment 2. The content viewing request is transmitted as a SETUP message (message in which "SETUP" is set as the method) of a RTSP message (message according to RTSP).

The media functions part 60 then receives the content viewing request. Subsequently, the media functions part 60 acquires, from the received content delivery instruction, a content delivery instruction containing the main content identification information and user identification information contained in this received content viewing request. The media functions part 60 thus acquires play-list information contained in the acquired content delivery instruction.

Subsequently, the media functions part 60 generates viewing content data on the basis of the acquired play-list information, and the advertisement content data and main content data stored in the content data storage 62. In other words, the media functions part 60 generates viewing content data representing viewing content in which the advertisement content is inserted in the main content (step D502, viewing content generation step).

The media functions part 60 transmits a content delivery preparation completion notification to the user equipment 2 which has transmitted the content viewing request (step D503). The content delivery preparation completion notification is transmitted as an OK message (response containing "OK" and "200" as a status code in the start line) of a RTSP message.

Upon receiving the content delivery preparation completion notification, the user equipment 2 transmits a reproduction start request to the media functions part 60 (step A504). The reproduction start request is transmitted as a PLAY message (message in which "PLAY" is set as the method) of a RTSP message.

Subsequently, upon receiving the reproduction start request, the media functions part 60 transmits a reproduction start notification to the user equipment 2. The reproduction start notification is information indicating that transmission of the content data is started. The reproduction start notification is transmitted as an OK message of a RTSP message.

The media functions part 60 then transmits the viewing content data generated in step D502 described above to the user equipment 2 (step D505, viewing content delivery step). This transmission of the data is performed by the media functions part 60 using the session established by the core IMS part 30 according to RTP.

Thus, the user equipment 2 receives the viewing content data and causes the television receiver (not shown) to display the viewing content represented by the received viewing content data (video, in this example).

According to the first embodiment of the content delivery system of the present invention, as described above, the content delivery system 1 transmits to the user equipment 2 the viewing content data representing viewing content in which the advertisement content selected based on the advertisement selection information is inserted in the main content. Accordingly, it is made possible to cause the user to view the viewing content in which the advertisement content selected according to the advertisement selection information is inserted.

Further, in the first embodiment, the advertisement selection information contains the user basic information associated with the user identification information. This enables the content delivery system 1 to cause the user of the user equipment 2 which has transmitted the content delivery request to view the viewing content in which the advertisement content selected according to the user is inserted.

In addition, in the first embodiment described above, the advertisement selection information contains the content basic information associated with the main content identification information. This enables the content delivery system 1 to cause the user to view the viewing content in which the advertisement content selected according to the main content identified by the main content identification information contained in the received content delivery request is inserted.

Further, in the first embodiment, the service control functions part 40 is configured to transmit play-list information containing selected advertisement content specification information to the media server 4b via the connection control system 3 when the connection control system 3 executes a process for establishing connection. This enables the service control server 4*a* to transmit to the media server 4*b* the play-list information in which the latest advertisement selection information at the time when the connection control system 3 executes a process for establishing connection is reflected.

In addition, in the first embodiment described above, the service control functions part 40 is configured to transmit play-list information containing selected advertisement content specification information to the media server 4*b* via the connection control system 3 by incorporating the play-list information into a connection establishment message.

According to this configuration, no other message than the connection establishment message need be transmitted for the service control server 4*a* transmitting the play-list information to the media server 4*b*. This means that the number of communications can be reduced among the connection control system 3, the service control server 4*a* and the media server 4*b*. In other words, the processing load and/or communication load required for the connection control system 3, the service control server 4*a* and the media server 4*b* to exchange messages can be relieved.

Although in the first embodiment described above, the play-list information is contained in the header HD of the INVITE message, the play-list information may be contained in the start line (Request-Line) of the INVITE message. For example, as shown in FIG. 7, the play-list information PL may be contained in the Request-URI (Uniform Resource Identifier) in the start line.

Although in the first embodiment described above, the play-list information is contained in the header HD of the INVITE message, the play-list information may be contained in the body BD of the INVITE message. For example, as shown in FIG. 8, the play-list information PL may be contained in the body BD as a value of "videosequence" in the values of type "a" in SDP (Session Description Protocol).

Further, although in the first embodiment described above, the play-list information is contained in the header HD of an INVITE message, the body BD of the INVITE message may be formed of a first part according to a first format and a second part according to a second format (that is, the body BD is multi-parted), and the play-list information may be contained in one of the first and second parts.

For example, as shown in FIG. 9, the body may include a first part BD1 according to SDP format and a second part BD2 according to text format, and the play-list information may be contained in the second part BD2.

Further, although in the first embodiment described above, the play-list information is contained directly in the INVITE message, reference information may be contained in the INVITE message so that the play-list information can be referred to in the reference information. For example, as show in FIG. 10, reference information (substantially play-list information) PL representing the URI for referring to (acquiring) the play-list information may be contained in the INVITE message as the value of the type "u" in SDP in the body BD.

The first embodiment described above is configured to simultaneously establish both of the connection for performing communication according to RTSP (RTSP connection) and the connection for performing communication according to RTP (RTP connection) by the execution of the processes of step A501 to step E501. In another modification of the first embodiment, the configuration may be such that the RTSP connection is established first by the execution of the processes of step A501 to step E501 and then the RTP connection is established by the execution of the same processes as those in step A501 to step E501.

First Modification of the First Embodiment

A content delivery system according to a first modification of the first embodiment of the present invention will be described. This content delivery system according to the first modification is different from the content delivery system according to the first embodiment in that the play-list information is contained in a message other than the connection establishment message. Therefore, the following description will be made focusing on the difference.

Figure 11:
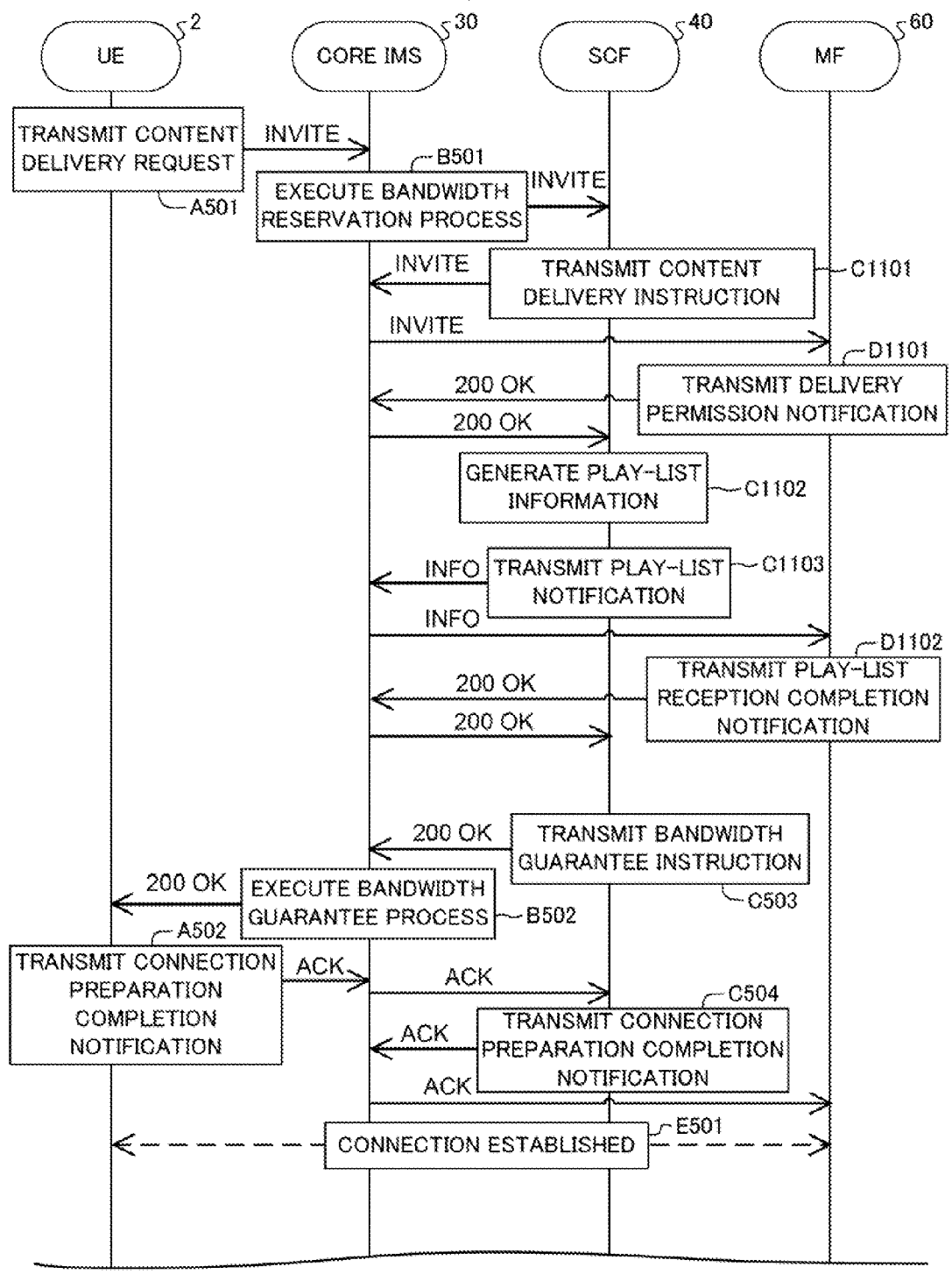
FIG. 11 is a sequence diagram illustrating operation performed by a content delivery system according to a first modification of the first embodiment when transmitting viewing content data to the user equipment in response to an input of the user of the user equipment.

Unlike the first embodiment, the service control functions part 40 according to the first modification does not generate play-list information upon receiving a content delivery request transmitted by the user equipment 2. The service control functions part 40 transmits a content delivery instruction containing no play-list information to the media functions part 60 via the core IMS part 30, as shown in FIG. 11 (step C1101).

Upon receiving the content delivery instruction, the media functions part 60 transmits a delivery permission notification to the service control functions part 40 via the core IMS part 3 in the same manner as in step D501 according to the first embodiment (step D1101). The delivery permission notification is transmitted as an OK message of a SIP message.

Upon receiving the delivery permission notification, the service control functions part 40 generates play-list information in the same manner as in step C501 according to the first embodiment (step C1102). Subsequently, the service control functions part 40 transmits a play-list notification containing the generated play-list information to the media functions part 60 via the core IMS part 30 (step C1103). The play-list notification is transmitted as an INFO message (message in which "INFO" is set as the method) of a SIP message. The play-list notification may be transmitted as a MESSAGE message (message in which "MESSAGE" is set as the method) in a SIP message.

Thus, the media functions part 60 receives the play-list notification. The media functions part 60 then transmits a play-list reception completion notification to the service control functions part 40 via the core IMS part 30 (step D1102). The play-list reception completion notification is information indicating that the play-list notification has been received. The play-list reception completion notification is transmitted as an OK message of a SIP message.

Once the service control functions part 40 receives the play-list reception completion notification, the content delivery system 1 establishes connection between the user equipment 2 and the media server 4*b* by executing the same processes as those in step C503 and onwards according to the first embodiment, and transmits viewing content data from the media server 4*b* to the user equipment 2.

This first modification also provides the same advantages and effects as those of the first embodiment.

Second Modification of the First Embodiment

A content delivery system according to a second modification of the first embodiment of the present invention will be described. This content delivery system according to the second modification differs from the content delivery system according to the first embodiment in that the play-list information is contained in a message other than the connection establishment message. Therefore, the following description will be made focusing on the difference.

Figure 12:
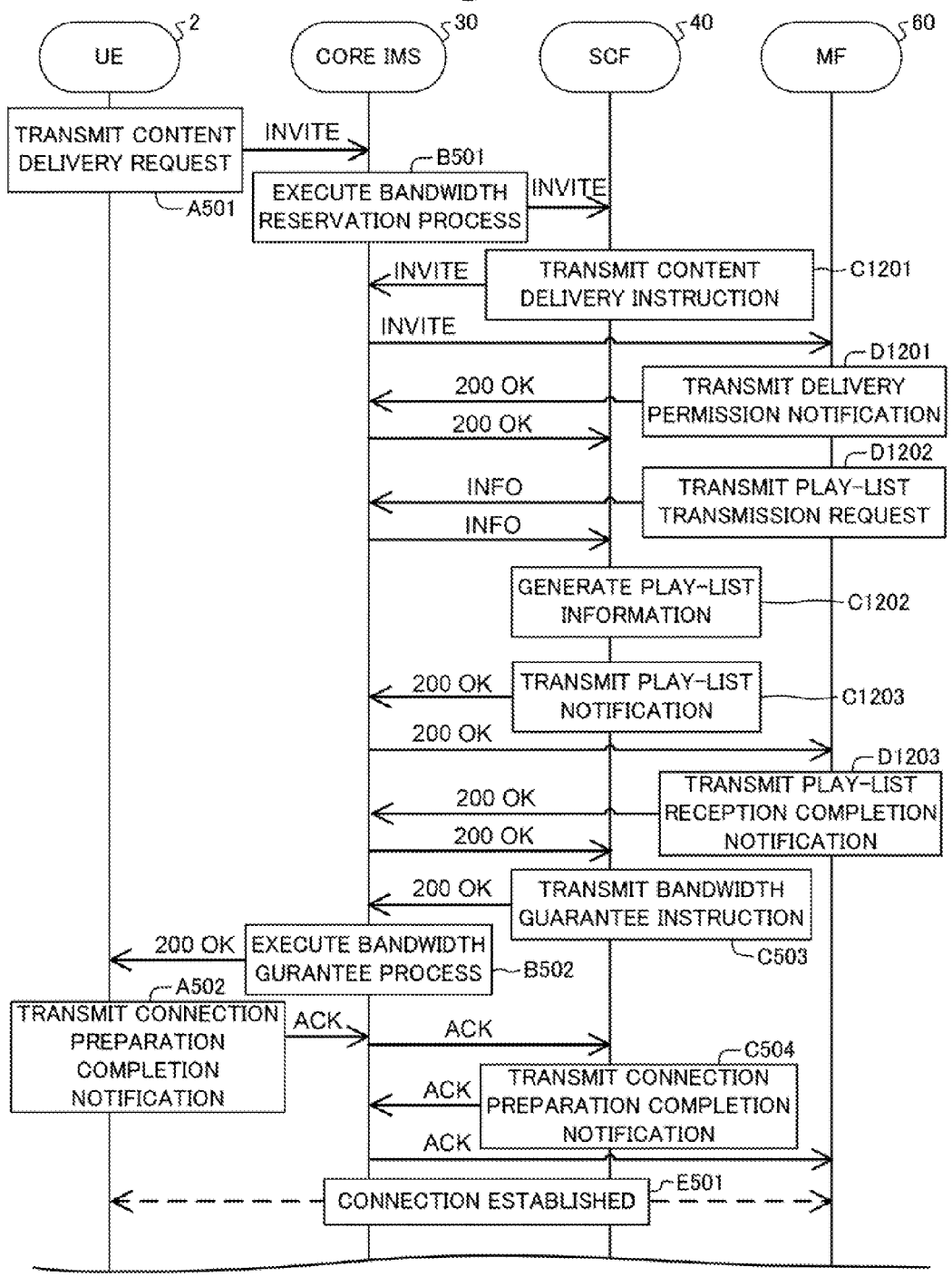
FIG. 12 is a sequence diagram showing operation performed by a content delivery system according to a second modification of the first embodiment when transmitting viewing content data to the user equipment in response to an input of the user of the user equipment.

Unlike the first embodiment, the service control functions part 40 according to the second modification does not generate play-list information upon receiving a content delivery request transmitted by the user equipment 2. The service control functions part 40 transmits a content delivery instruction containing no play-list information to the media functions part 60 via the core IMS part 30, as shown in FIG. 12 (step C1201).

Upon receiving the content delivery instruction, the media functions part 60 transmits a delivery permission notification to the service control functions part 40 via the core IMS part 30 in the same manner as in step D501 according to the first embodiment (step D1201). The delivery permission notification is transmitted as an OK message of a SIP message.

Further, the media functions part 60 transmits a play-list transmission request to the service control functions part 40 via the core IMS part 30 (step D1202). The play-list transmission request contains user identification information, equipment address information and main content identification information contained in the received content delivery instruction, and is information indicating a request for transmission of play-list information. The play-list transmission request is transmitted as an INFO message of a SIP message. The play-list transmission request may be transmitted as a MESSAGE message of a SIP message.

Upon receiving the play-list transmission request, the service control functions part 40 generates play-list information in the same manner as in step C501 according to the first embodiment (step C1202). Subsequently, the service control functions part 40 transmits a play-list notification containing the generated play-list information to the media functions part 60 via the core IMS part 30 (step C1203). The play-list notification is transmitted as an OK message of a SIP message.

Thus, the media functions part 60 receives the play-list notification. The media functions part 60 then transmits a play-list reception completion notification to the service control functions part 40 via the core IMS part 30 (step D1203). The play-list reception completion notification is information indicating that the play-list notification has been received. The play-list reception completion notification is transmitted as an OK message of a SIP message.

Once the service control functions part 40 receives the play-list reception completion notification, the content delivery system 1 establishes connection between the user equipment 2 and the media server 4b and transmits viewing content data from the media server 4b to the user equipment 2 by executing the same processes as those in step C503 and onwards according to the first embodiment.

This first modification also provides the same advantages and effects as those of the first embodiment.

Second Embodiment

Next, a content delivery system according to a second embodiment of the present invention will be described. The content delivery system according to the second embodiment differs from the content delivery system according to the first embodiment in that while advertisement attribute information is transmitted to the media functions part 60 from the service control functions part 40, the media functions part 60 generates play-list information based on this advertisement attribute information. Therefore, the following description will be made focusing on the difference.

Figure 13:
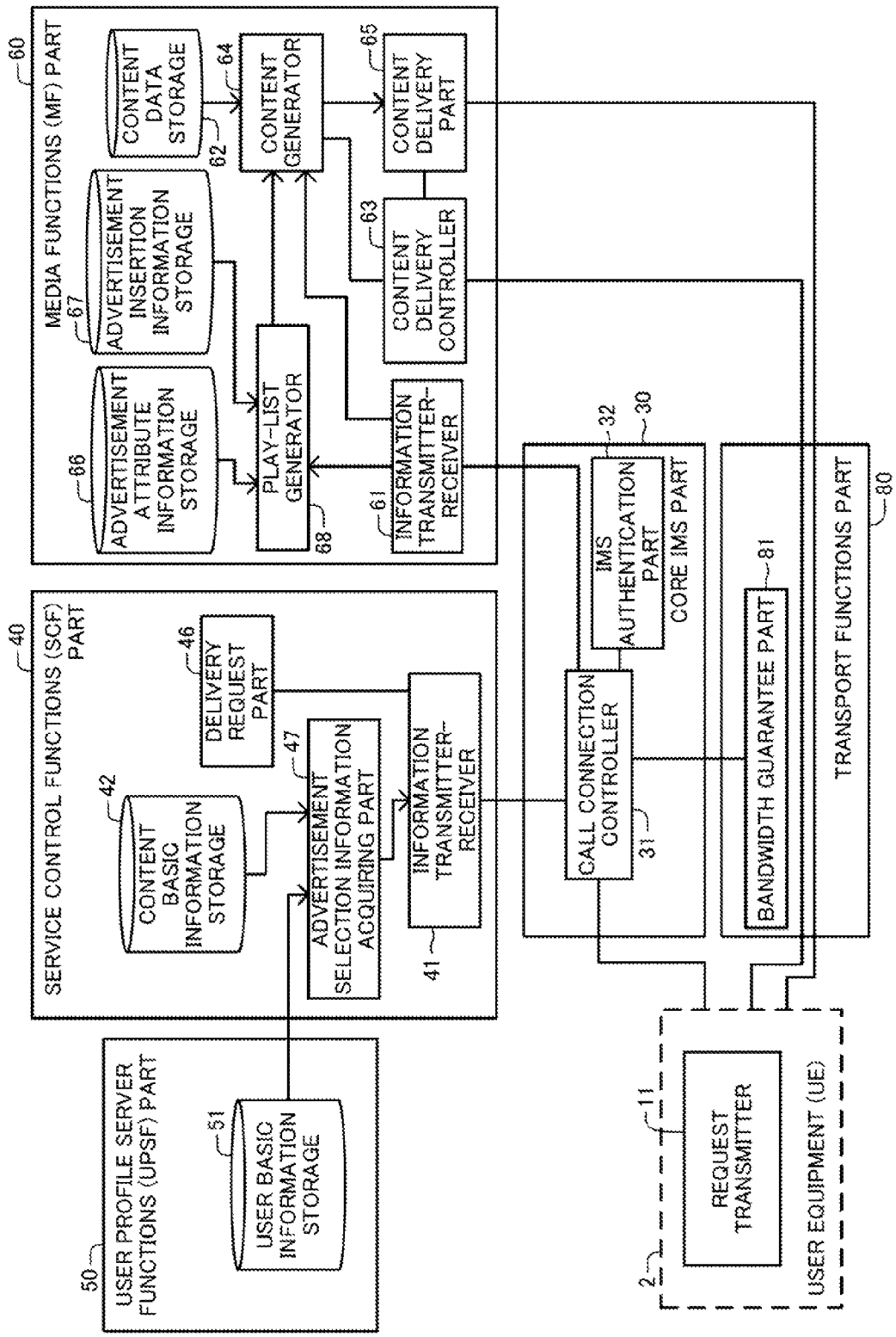
FIG. 13 is block diagram schematically illustrating functions of a content delivery system according to a second embodiment of the present invention.

As shown in FIG. 13, the service control functions part 40 according to the second embodiment does not include the advertisement attribute information storage 43, the advertisement insertion information storage 44, or the a play-list generator 45. The service control functions part 40 instead includes an advertisement selection information acquiring part 47.

The advertisement selection information acquiring part 47 accepts a content delivery request as a process request received by the information transmitter-receiver 41. The advertisement selection information acquiring part 47 acquires, from the user basic information stored in the user basic information storage 51, user basic information stored in association with the user identification information contained in the content delivery request received by the information transmitter-receiver 41.

Further, the advertisement selection information acquiring part 47 acquires, from the content basic information stored in the content basic information storage 42, content basic information stored in association with the main content identification information contained in the content delivery request.

The delivery request part 46 outputs a content delivery instruction. The content delivery instruction contains advertisement selection information containing the user basic information and content basic information acquired by the advertisement selection information acquiring part 47, and user authentication success information (i.e., user identification information), equipment address information and main content identification information contained in the content delivery request.

The information transmitter-receiver (delivery request reception means and advertisement selection information transmission means) 41 transmits the content delivery instruction output by the delivery request part 46 to the media server 4b via the core IMS part 30.

The media functions part 60 includes an advertisement attribute information storage 66 similar to the advertisement attribute information storage 43, an advertisement insertion information storage 67 similar to the advertisement insertion information storage 44, and a play-list generator (advertisement content selection means) 68 similar to the play-list generator 45.

The play-list generator 68 acquires, from the content delivery instruction received by the information transmitter-receiver (advertisement selection information reception means) 61, advertisement selection information contained in the content delivery instruction containing the user identification information and main content identification information contained in the content viewing request received by the content delivery controller 63.

The a play-list generator 68 then calculates a final priority level for each item of the advertisement attribute information based on the acquired advertisement selection information. Subsequently, the play-list generator 68 extracts, from the advertisement content identification information stored in the advertisement attribute information storage 66, advertisement content identification information associated with the item of advertisement attribute information the calculated final priority level of which is the highest.

On the other hand, the play-list generator 68 acquires, from the number-of-insertions information and insertion position information stored in the advertisement insertion information storage 67, number-of-insertions information and insertion position information stored in association with the main content identification information contained in the content viewing request.

The play-list generator 68 selects, from the extracted advertisement content identification information, a number of items of advertisement content identification information, the number being that represented by the acquired number-of-insertions information. Subsequently, the play-list generator 68 generates play-list information based on the selected advertisement content identification information, the main content identification information contained in the content delivery request, and the acquired insertion position information.

The content generator 64 then generates viewing content data based on the play-list information generated by the play-list generator 68, and the advertisement content data and main content data stored in the content data storage 62.

Figure 14:
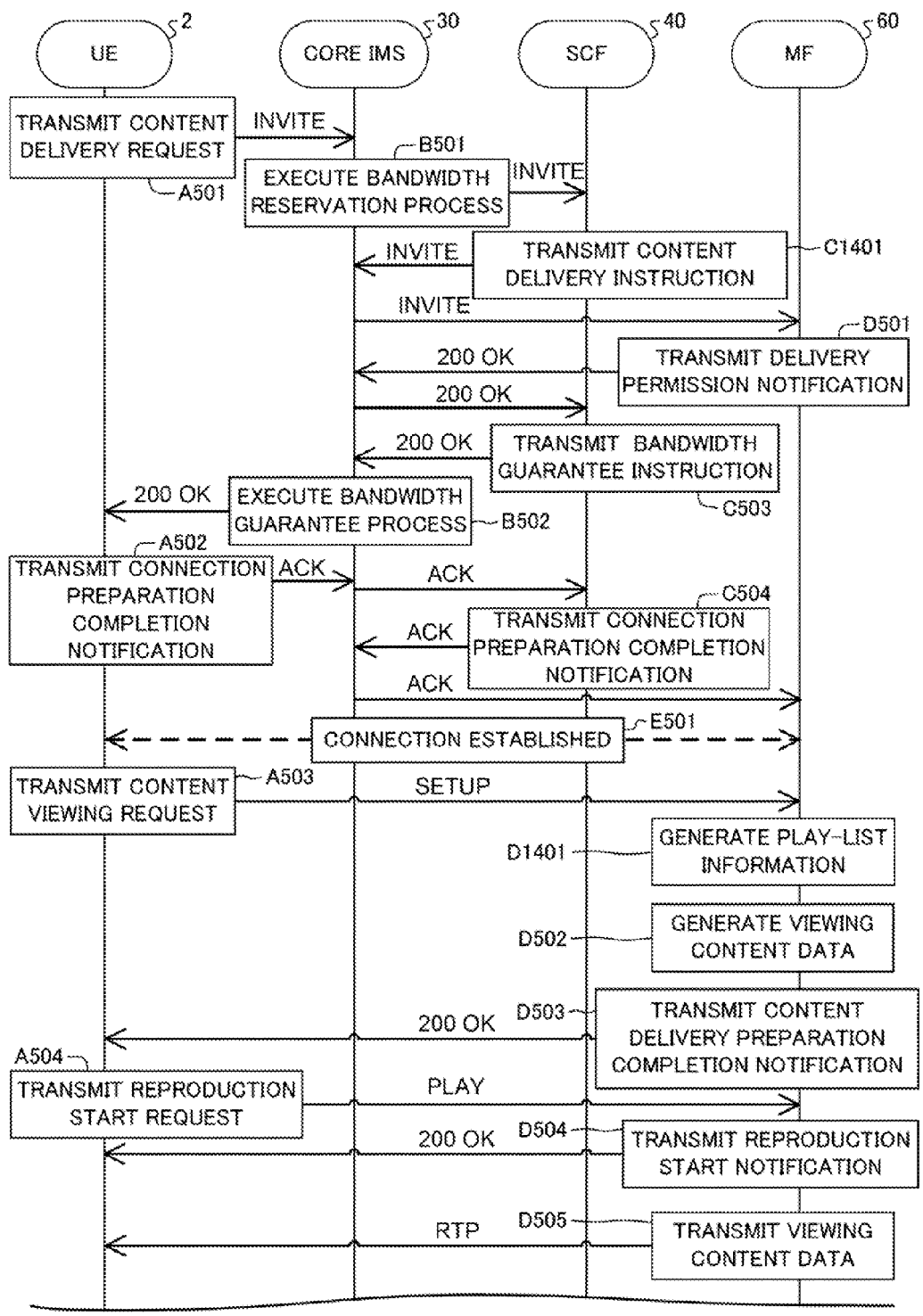
FIG. 14 is a sequence diagram illustrating operation performed by the content delivery system according to the second embodiment of the present invention when transmitting viewing content data to the user equipment in response to an input of the user of the user equipment.

Unlike the first embodiment, the service control functions part 40 according to the second embodiment does not generate play-list information upon receiving the content delivery request transmitted by the user equipment 2 (delivery request reception step). As shown in FIG. 14, the service control functions part 40 transmits a content delivery instruction containing advertisement selection information instead of the play-list information, to the media functions part 60 via the core IMS part 30 (step C1401, advertisement selection information transmission step).

The content delivery instruction is transmitted as an INVITE message in a SIP message. As shown in FIG. 15, the INVITE message includes a header HD and a body BD. In this example, the user basic information UI in the advertisement selection information is contained as values of the field "X-user-favorite" in the header HD of the INVITE message. The content basic information CI in the advertisement selection information is contained as values of the field "X-content-favorite" in the header HD of the INVITE message.

In this example, each of the user basic information UI and the content basic information CI includes portions of element information separated with commas. Each portion of the element information is separated into two parts with semicolons. The leading part of the two parts represents advertisement attribute information (e.g., "car" represents cars, and "real estate" represents real estate), while the end part represents priority information.

This INVITE message is one of connection establishment messages which the core IMS part 30 exchanges with the user equipment 2, the service control functions part 40 and the media functions part 60 so that the core IMS part 30 establishes connection between the user equipment 2 and media functions part 60.

It can be said that the service control functions part 40 transmits the selected advertisement content specification information to the media functions part 60 (media server 4b) via the core IMS part 30 by incorporating the selected advertisement content specification information in the connection establishment message.

In other words, it can be said that the service control functions part 40 transmits play-list information containing selected advertisement content specification information to the media server 4b via the core IMS part 30 when the core IMS part 30 executes a process for establishing connection between the user equipment 2 and the media functions part 60.

Once the media functions part 60 receives the content delivery instruction (advertisement selection information reception step), the content delivery system 1 establishes connection between the user equipment 2 and the media server 4b by executing the processes in step D501 to step E501 according to the first embodiment (connection establishment step).

The user equipment 2 then transmits a content viewing request to a media server 4b (media functions part 60) specified by the media delivery specification information contained in the received delivery preparation completion notification (step A503).

The media functions part 60 thus receives the content viewing request. Subsequently, the media functions part 60 acquires, from the received content delivery instruction, a content delivery instruction containing the main content identification information and user identification information contained in the received content viewing request. The media functions part 60 then acquires advertisement selection information contained in the acquired content delivery instruction.

Subsequently, the media functions part 60 selects advertisement content identification information based on the acquired advertisement selection information, the advertisement content identification information stored in the advertisement attribute information storage 66, and the number-of-insertions information and insertion position information stored in the advertisement insertion information storage 67 (advertisement content selection step). Further, the media functions part 60 generates play-list information based on the selected advertisement content identification information, the main content identification information contained in the content viewing request, and the insertion position information stored in the advertisement insertion information storage 67 (step D1401).

Subsequently, the media functions part 60 generates viewing content data based on the generated play-list information and the advertisement content data and main content data stored in the content data storage 62 (step D502, viewing content generation step).

The content delivery system 1 then transmits the generated viewing content data to the user equipment 2 from the media server 4b by executing the same processing steps as those in step D503 and onwards according to the first embodiment (viewing content delivery step).

In the second embodiment of the content delivery system according to the present invention, as described above, like the first embodiment, the content delivery system 1 transmits to the user equipment 2 viewing content data representing viewing content in which advertisement content selected based on advertisement selection information is inserted in main content. Therefore, it is possible to cause a user to view the viewing content in which the advertisement content selected according to the advertisement selection information is inserted.

Further, in the second embodiment, the advertisement selection information contains user basic information associated with user identification information. This enables the content delivery system 1 to cause a user of the user equipment 2 which has transmitted a content delivery request to view viewing content in which advertisement content selected according to the user is inserted.

In addition, in the second embodiment, the advertisement selection information contains content basic information associated with main content identification information. This enables the content delivery system 1 to cause the user to view viewing content in which advertisement content selected according to main content identified by the main content identification information contained in the content delivery request is inserted.

Further, in the second embodiment, the service control functions part 40 is configured to transmit advertisement selection information to the media server 4b via the connection control system 3 when the connection control system 3 executes a process for establishing connection. This enables the service control server 4a to transmit to the media server 4b the latest advertisement selection information at the time when the connection control system 3 executes the process for establishing connection. As a result, the media server 4b is able to select advertisement content data based on this updated advertisement selection information.

In addition, in the second embodiment, the service control functions part 40 is configured to transmit the advertisement selection information to the media server 4b via the connection control system 3 by incorporating the advertisement selection information in a connection establishment message.

This releases the service control server 4a from the need to transmit other messages than the connection establishment message in order to transmit the advertisement selection information to the media server 4b. This means that the number of communications performed among the connection control system 3, the service control server 4a and the media server 4b can be reduced. In other words, the processing load and/or the communication load required for the connection control system 3, the service control server 4a and the media server 4b to exchange messages can be reduced.

Third Embodiment

Next, a content delivery system according to a third embodiment of the present invention will be described. The content delivery system according to the third embodiment differs from the content delivery system according to the first embodiment in that while selected advertisement content specification information is transmitted from the service control functions part 40 to the media functions part 60, the media functions part 60 generates play-list information based on the selected advertisement content specification information. Therefore, the following description will be made focusing on the difference.

Figure 16:
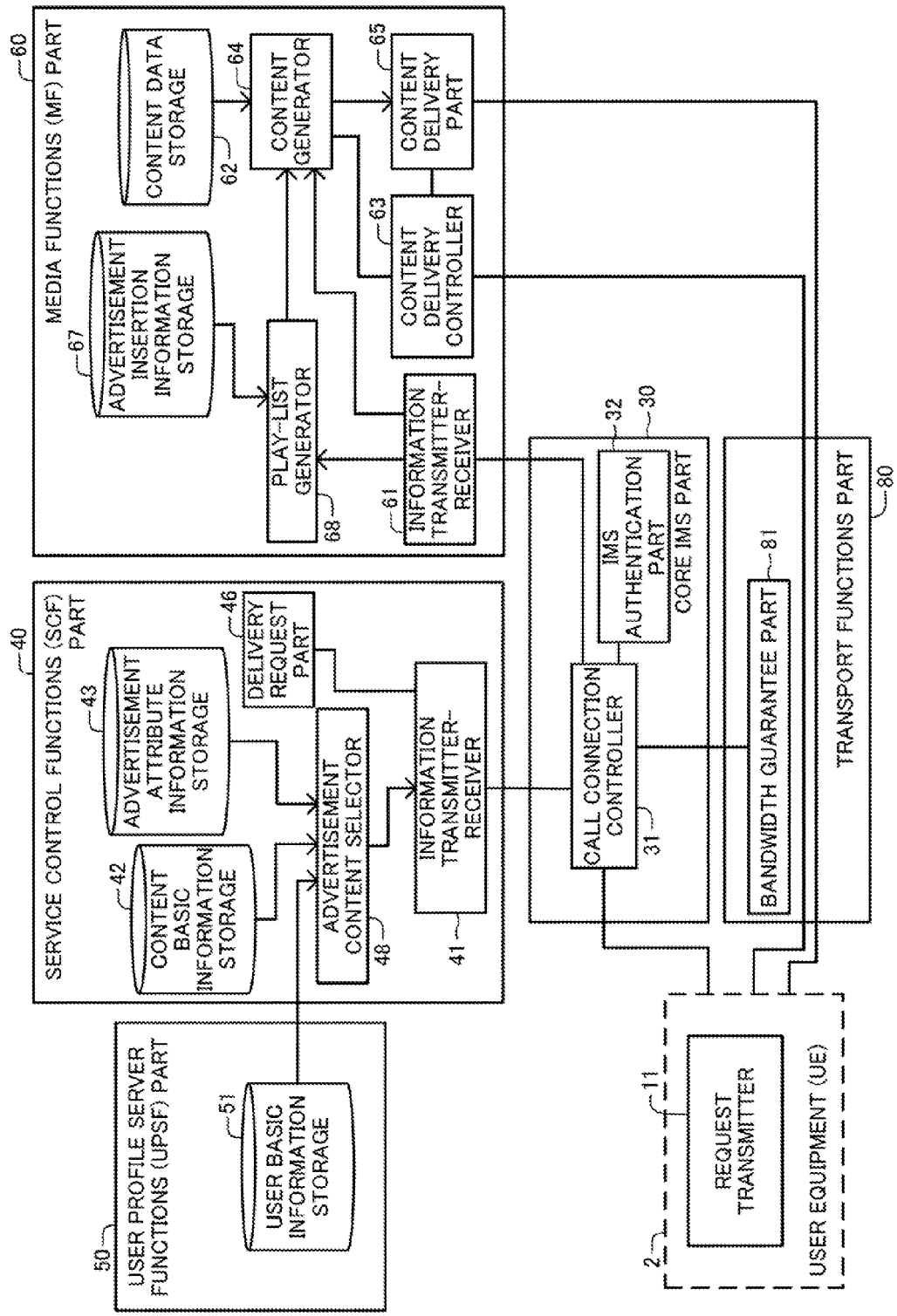
FIG. 16 is a block diagram schematically illustrating functions of a content delivery system according to a third embodiment of the present invention.

The service control functions part 40 according to the third embodiment as shown in FIG. 16 does not include the advertisement insertion information storage 44 or the play-list generator 45. The service control functions part 40 includes an advertisement content selector (advertisement content selection means) 48.

The content basic information storage 42 according to the third embodiment stores content basic information and number-of-insertions information in association with main content identification information for identifying main content.

The advertisement content selector 48 accepts a content delivery request as a process request received by the information transmitter-receiver 41. The advertisement content selector 48 acquires, from the user basic information stored in the user basic information storage 51, user basic information stored in association with the user identification information contained in the content delivery request received by the information transmitter-receiver 41.

Further, the advertisement content selector 48 acquires, from the content basic information stored in the content basic information storage 42, content basic information stored in association with the main content identification information contained in the content delivery request.

The advertisement content selector 48 then calculates a final priority level for each item of the advertisement attribute information, based on the acquired user basic information and the acquired content basic information. Subsequently, the advertisement content selector 48 extracts, from the advertisement content identification information stored in the advertisement attribute information storage 43, advertisement content identification information associated with the item of advertisement attribute information the calculated final priority level of which is the highest.

On the other hand, the advertisement content selector 48 acquires, from the number-of-insertions information stored in the content basic information storage 42, number-of-insertions information stored in association with the main content identification information contained in the content delivery request. The advertisement content selector 48 then selects, from the extracted advertisement content identification information, a number of items of advertisement content identification information, the number being that represented by the acquired number-of-insertions information.

The delivery request part 46 outputs a content delivery instruction. The content delivery instruction includes selected advertisement content specification information containing the advertisement content identification information selected by the advertisement content selector 48, and user authentication success information (i.e., user identification information), equipment address information and main content identification information contained in the content delivery request.

The information transmitter-receiver (delivery request reception means and selected advertisement content specification information transmission means) 41 transmits the content delivery instruction output by the delivery request part 46 to the media server 4b via the core IMS part 30.

The media functions part 60 includes an advertisement insertion information storage 67 similar to the advertisement insertion information storage 44, and a play-list generator 68 similar to the play-list generator 45.

The play-list generator 68 acquires, from the content delivery instruction received by the information transmitter-receiver (advertisement selection information reception means) 61, selected advertisement content specification information contained in the content delivery instruction containing the main content identification information and user identification information contained in the content viewing request received by the content delivery controller 63.

On the other hand, the play-list generator 68 acquires, from the insertion position information stored in the advertisement insertion information storage 67, insertion position information stored in association with the main content identification information contained in the content viewing request.

The play-list generator 68 then generates play-list information based on the advertisement content identification information contained in the acquired selected advertisement content specification information, the main content identification information contained in the content delivery request, and the acquired insertion position information.

The content generator 64 then generates viewing content data based on the play-list information generated by the play-list generator 68, and the advertisement content data and main content data stored in the content data storage 62.

Unlike the first embodiment, the service control functions part 40 according to the third embodiment does not generate play-list information upon receiving the content delivery request transmitted by the user equipment 2 (delivery request reception step). As shown in FIG. 17, the service control functions part 40 transmits a content delivery instruction containing selected advertisement content specification information instead of play-list information to the media functions part 60 via the core IMS part 30 (step C1701, selected advertisement content specification information transmission step).

The content delivery instruction is transmitted as an INVITE message of a SIP message. As shown in FIG. 18, the INVITE message includes a header HD and a body BD. In this example, selected advertisement content specification information AD is contained as values of the field "X-video-advertisement" in the header HD of the INVITE message. In this example, the selected advertisement content specification information AD includes advertisement content identification information separated with commas.

This INVITE message is one of connection establishment messages which the core IMS part 30 exchanges with the user equipment 2, the service control functions part 40 and the media functions part 60 so that the core IMS part 30 establishes connection between the user equipment 2 and the media functions part 60.

It can be said that the service control functions part 40 transmits selected advertisement content specification information to the media functions part 60 (media server 4*b*) via the core IMS part 30 by incorporating the selected advertisement content specification information in the connection establishment message.

In other words, it can be said that the service control functions part 40 transmits play-list information containing the selected advertisement content specification information to the media server 4*b* via the core IMS part 30 when the core IMS part 30 executes a process for establishing connection between the user equipment 2 and the media functions part 60.

Once the media functions part 60 receives the content delivery instruction (selected advertisement content specification information reception step), the content delivery system 1 establishes connection between the user equipment 2 and the media server 4*b* by executing the processes of step D501 to step E501 according to the first embodiment (connection establishment step).

Then, the user equipment 2 transmits a content viewing request to a media server 4*b* (media functions part 60) specified by the media delivery specification information contained in the received delivery preparation completion notification (step A503).

Thus, the media functions part 60 receives the content viewing request. Subsequently, the media functions part 60 acquires, from the received content delivery instruction, a content delivery instruction containing the main content identification information and user identification information contained in the received content viewing request. The media functions part 60 then acquires selected advertisement content specification information contained in the acquired content delivery instruction.

Subsequently, the media functions part 60 generates play-list information based on the advertisement content identification information contained in the acquired selected advertisement content specification information, the insertion position information stored in the advertisement insertion information storage 67, and the main content identification information contained in the content viewing request (step D1701).

Subsequently, the media functions part 60 generates viewing content data based on the generated play-list information, and the advertisement content data and main content data stored in the content data storage 62 (step D502, viewing content generation step).

The content delivery system 1 then transmits the generated viewing content data to the user equipment 2 from the media server 4*b* by executing the same processes as those of step D503 and onwards according to the first embodiment (viewing content delivery step).

This third embodiment is also capable of providing the same advantages and effects as those of the second embodiment.

Fourth Embodiment

Next, a content delivery system according to a fourth embodiment of the present invention will be described with reference to FIG. 19.

Functions of the content delivery system 1 according to the fourth embodiment include a content storage RC, a delivery request receiver 101, an advertisement content selector 102, a viewing content generator 103, and a viewing content transmitter 104.

The content storage RC stores advertisement content data representing advertisement content and main content data representing main content.

The delivery request receiver 101 receives a content delivery request containing main content identification information for specifying main content and transmitted by the user equipment 2, via the connection control system 3.

The advertisement content selector 102 selects the advertisement content data stored in the content storage RC based on advertisement selection information containing advertisement attribute information representing attributes of the advertisement content.

Based on the selected advertisement content data and the main content data identified by the content delivery request received by the delivery request receiver 101, the viewing content generator 103 generates viewing content data representing viewing content in which the advertisement content represented by the advertisement content data is inserted in the main content represented by the main content data.

When connection between the viewing content transmitter 104 and the user equipment 2 which has transmitted the content delivery request is established by the connection control system 3, the viewing content transmitter 104 transmits the viewing content data generated by the viewing content generator 103 to the user equipment 2.

According to this fourth embodiment as well, the content delivery system 1 transmits to the user equipment 2 the viewing content data representing the viewing content in which the advertisement content selected based on the advertisement selection information is inserted in the main content. Therefore, the content delivery system 1 can be configured to select advertisement content according to the main content (user's desired content) and/or the user, for example, whereby it is made possible to cause the user to view the viewing content in which the advertisement content according to the main content and/or the user is inserted.

In this case, it is preferable that: the content storage means is configured to store the advertisement content data in association with advertisement attribute information representing attributes of advertisement content represented by the advertisement content data; the advertisement selection information contains user basic information that is information for specifying the advertisement attribute information and is information associated with user identification information for identifying a user of the user equipment; and the advertisement content selection means is configured to select advertisement content data stored in association with the advertisement attribute information specified by the user basic information associated with the user identification information for identifying the user of the user equipment which has transmitted the content delivery request.

This enables the content delivery system to cause a user of the user equipment which has transmitted the content delivery request to view viewing content in which advertisement content selected according to the user is inserted.

In this case, it is preferable that the content storage means is configured to store the advertisement content data in association with the advertisement attribute information representing attributes of the advertisement content represented by the advertisement content data; the advertisement selection information contains content basic information that is information for specifying the advertisement attribute information and is information associated with the main content identification information for specifying the main content; and the advertisement content selection means is configured to select advertisement content data stored in association with the advertisement attribute information specified by the content basic information associated with the main content identification information contained in the received content delivery request.

This enables the content delivery system to cause the user to view viewing content in which advertisement content selected according to the main content identified by the main content identification information contained in the received content delivery request is inserted.

In this case, it is preferable that: the application server system comprises a service control server and a media server; the service control server comprises the delivery request reception means and the advertisement content selection means; the media server comprises the content storage means, the viewing content generation means, and the viewing content delivery means; the service control server further comprises selected advertisement content specification information transmission means for transmitting selected advertisement content specification information for specifying advertisement content data selected by the advertisement content selection means to the media server via the connection control system; the media server further comprises selected advertisement content specification information reception means for receiving the selected advertisement content specification information transmitted by the service control server; and the viewing content generation means is configured to generate the viewing content data based on the advertisement content data specified by the received selected advertisement content specification information.

In this case, it is preferable that: the selected advertisement content specification information transmission means is configured to transmit to the media server via the connection control system, play-list information that is information containing the main content identification information contained in the content delivery request and the selected advertisement content specification information, and is information containing information indicating a sequence in which the main content identified by the main content identification information and the advertisement content specified by the selected advertisement content specification information are arranged in the viewing content; the selected advertisement content specification information reception means is configured to receive the play-list information transmitted by the service control server; and the viewing content generation means is configured to generate the viewing content data based on the received play-list information.

In this case, it is preferable that the selected advertisement content specification information transmission means is configured to transmit the selected advertisement content specification information to the media server via the connection control system when the connection control system executes a process for establishing the connection.

When the service control server is configured to transmit the selected advertisement content specification information to the media server before the connection control system executes a process for establishing connection, and if the advertisement selection information is altered after transmission of the selected advertisement content specification information, this altered advertisement selection information cannot be reflected in the selected advertisement content specification information received by the media server.

According to the configuration of the invention above, however, the service control server is capable of transmitting to the media server the selected advertisement content specification information in which the latest advertisement selection information at the time when the connection control system executes a process for establishing connection is reflected.

In this case, it is preferable that: the connection control system is configured to establish the connection by exchanging a predetermined connection establishment message with the service control server and the media server; and the selected advertisement content specification information transmission means is configured to transmit the selected advertisement content specification information to the media server via the connection control system by incorporating the selected advertisement content specification information in the connection establishment message.

This eliminates the need of the service control server to transmit any other message than the connection establishment message in order to transmit the selected advertisement content specification information to the media server. This means that the number of communications performed among the connection control system, the service control server, and the media server can be reduced. In other words, the processing load and/or communication load required for the connection control system, the service control server, and the media server to exchange messages can be reduced.

In another embodiment of the content delivery system, it is preferable that: the application server system comprises a service control server and a media server; the service control server comprises delivery request reception means; the media server comprises the content storage means, the advertisement content selection means, the viewing content generation means, and the viewing content delivery means; the service control server further comprises advertisement selection information transmission means for transmitting the advertisement selection information to the media server via the connection control system; the media server further comprises advertisement selection information reception means for receiving the advertisement selection information transmitted by the service control server; and the advertisement content selection means is configured to select the advertisement content data based on the received advertisement selection information.

In this case, it is preferable that the advertisement selection information transmission means is configured to transmit the advertisement selection information to the media server via the connection control system when the connection control system executes a process for establishing the connection.

When the service control server is configured to transmit the advertisement selection information to the media server before the connection control system executes a process for establishing connection, and if the advertisement selection information is altered after transmission of the advertisement selection information, the media server is not able to select the advertisement content data based on the altered advertisement selection information.

According to the configuration of the invention described above, however, the service control server is able to transmit to the media server the latest advertisement selection information at the time when the connection control system executes a process for establishing connection. As a result, the media server is allowed to select the advertisement content data based on the altered advertisement selection information.

In this case, it is preferable that: the connection control system is configured to establish the connection by exchange a predetermined connection establishment message with the service control server and the media server; and the advertisement selection information transmission means is configured to transmit the advertisement selection information to the media server via the connection control system by incorporating the advertisement selection information in the connection establishment message.

This eliminates the need of the service control server to transmit any other message than the connection establishment message in order to transmit the advertisement selection information to the media server. This means that the number of communications performed among the connection control system, the service control server, and the media server can be reduced. In other words, the processing load and/or the communication-load required for the connection control system, the service control server, and the media server to exchange messages can be reduced.

Another aspect of the present invention provides a content delivery system including an application server system and a connection control system.

The connection control system includes a core IMS part (Core IMS (Internet Protocol Multimedia Subsystem) part) for receiving equipment specification information transmitted by user equipment and establishing connection between the application server system and the user equipment based on the received equipment specification information.

Additionally, the application server system includes: a media functions part for transmitting content data representing content to the user equipment with which the connection is established by the connection control system; a service control functions part for controlling services provided by the media functions part; and a user profile server functions part for storing profile information of a user of the user equipment, and the application server system further includes: content storage means for storing advertisement content data representing advertisement content and main content data representing main content; and advertisement content selection means for selecting the stored advertisement content data based on advertisement selection information containing advertisement attribute information representing attributes of the advertisement content and preliminarily stored by the user profile server functions part, the service control functions part or the connection control system.

Further, the service control functions part includes delivery request reception means for receiving a content delivery request containing main content identification information for identifying the main content and transmitted by the user equipment, via the core IMS part.

In addition, the media functions part includes: viewing content generation means for generating, based on the selected advertisement content data and main content data identified by the received content delivery request, viewing content data representing viewing content in which advertisement content represented by the advertisement content data is inserted in main content represented by the main content data; and viewing content delivery means for transmitting the generated viewing content data to the user equipment if connection with the user equipment which has transmitted the content delivery request is established by the core IMS part.

In this case, it is preferable that: the service control functions part comprises the advertisement content selection means; the service control functions part further comprises selected advertisement content specification information transmission means for transmitting to the media functions part via the core IMS part, selected advertisement content specification information specifying the advertisement content data selected by the advertisement content selection means when the core IMS part executes the process for establishing the connection; the media functions part comprises selected advertisement content specification information reception means for receiving the selected advertisement content specification information transmitted by the service control functions part; and the viewing content generation means is configured to generate the viewing content data based on the advertisement content data specified by the received selected advertisement content specification information.

In this case, it is preferable that: the selected advertisement content specification information transmission means is configured to transmit to the media functions part via the core IMS part, play-list information that is information containing the main content identification information contained in the content delivery request and the selected advertisement content specification information, and is information containing information indicating a sequence in which the main content identified by the main content identification information and the advertisement content specified by the selected advertisement content specification information are arranged in the viewing content; the selected advertisement content specification information reception means is configured to receive the play-list information transmitted by the service control functions part; and the viewing content generation means is configured to generate the viewing content data based on the received play-list information.

In another embodiment of the content delivery system described above, it is preferable that: the media functions part comprises the advertisement content selection means; the service control functions part further comprises advertisement selection information transmission means for transmitting the advertisement selection information to the media functions part via the core IMS part when the core IMS part executes a process for establishing the connection; the media functions part comprises advertisement selection information reception means for receiving the advertisement selection information transmitted by the service control functions part; and the advertisement content selection means is configured to select the advertisement content data based on the received advertisement selection information.

Another aspect of the present invention provides a content delivery method which includes: receiving equipment specification information transmitted by user equipment and establishing connection between an application server system and the user equipment based on the received equipment specification information, by a connection control system; storing advertisement content data representing advertisement content and main content data representing main content in a storing device; receiving, via the connection control system, a content delivery request containing main content identification information for identifying the main content and transmitted by the user equipment, by the application server system; selecting the stored advertisement content data based on advertisement selection information containing advertisement attribute information representing attributes of the advertisement content; generating, based on the selected advertisement content data and main content data identified by the received content delivery request, viewing content data representing viewing content in which advertisement content represented by the advertisement content data is inserted in main content represented by the main content data; and transmitting the generated viewing content data to the user equipment if connection with the user equipment which has transmitted the content delivery request is established by the connection control system, by the application server system.

In this case, the content delivery method preferably includes: transmitting selected advertisement content specification information for specifying the selected advertisement content data to a media server included in the application server system via the connection control system when the connection control system executes a process for establishing the connection, by a service control server included in the application server system; receiving the selected advertisement content specification information transmitted by the service control server, by the media server; and generating the viewing content data based on the advertisement content data specified by the received selected advertisement content specification information.

In this case, the content delivery method preferably includes: when the selected advertisement content specification information is transmitted, transmitting to the media server via the connection control system, play-list information that is information containing the main content identification information contained in the content delivery request and the selected advertisement content specification information, and is information containing information indicating a sequence in which the main content identified by the main content identification information and the advertisement content specified by the selected advertisement content specification information are arranged in the viewing content; receiving the play-list information transmitted by the service control server, by the media server; and generating the viewing content data based on the received play-list information.

The content delivery method according to another embodiment of the present invention preferably includes: transmitting the advertisement selection information to a media server included in the application server system via the connection control system when the connection control system executes a process for establishing the connection, by a service control server included in the application server system; receiving the advertisement selection information transmitted by the service control server, by the media server; and selecting the advertisement content data based on the received advertisement selection information.

Another aspect of the present invention provides a computer program which includes instructions to for causing a service control server to realize: delivery request reception means for receiving a content delivery request containing main content identification information for identifying main content and transmitted by user equipment, via a connection control system establishing connection between a media server and the user equipment; advertisement content selection means for selecting advertisement content data preliminarily stored in a storing device based on advertisement selection information containing advertisement attribute information representing attributes of advertisement content; and selected advertisement content specification information transmission means for transmitting selected advertisement content specification information specifying the advertisement content data selected by the advertisement content selection means to the media server via the connection control system when the connection control system executes a process for establishing the connection.

In this case, it is preferable that the selected advertisement content specification information transmission means is configured to transmit to the media server via the connection control system, play-list information which is information containing the main content identification information contained in the content delivery request and the selected advertisement content specification information, and is information containing information indicating a sequence in which the main content identified by the main content identification information and the advertisement content specified by the selected advertisement content specification information are arranged in the viewing content.

Another aspect of the present invention provides a computer program which includes instructions for causing a service control server to realize: delivery request reception means for receiving a content delivery request containing main content identification information for identifying main content and transmitted by user equipment, via a connection control system establishing connection between a media server and the user equipment; and advertisement selection information transmission means for transmitting advertisement selection information containing advertisement attribute information representing attributes of advertisement content to the media server via the connection control system when the connection control system executes a process for establishing the connection.

The invention of the content delivery method or program having the configuration as described above is also capable of achieving the object of the present invention since it has the same advantageous effects as those of the content delivery system described above.

Although the present invention has been described in conjunction with the exemplary embodiments above, the invention is not limited to these embodiments. Configuration and particulars of the present invention may be altered variously as conceivable by those skilled in the art without departing from the scope of the claims of the present invention.

For example, although in the embodiments described above, the advertisement selection information contains both of user basic information and content basic information, it may contain only one of the user basic information and the content basic information.

Although in the embodiments described above, the user profile server functions part 50 is configured to include the user basic information storage 51, the service control functions part 40 instead of the user profile server functions part 50 may be configured to include the user basic information storage 51. In other words, the service control functions part 40 may store the user basic information in association with the user identification information.

Although in the embodiments described above, the advertisement selection information contains the user basic information and the content basic information, the advertisement selection information may contain, in place of the user basic information and/or the content basic information, or in addition to the user basic information and the content basic information, user equipment position information representing the position of the user equipment 2, date-and-time-of-transmission information representing the date and time (day of the week may also be included) when the content delivery request is transmitted, and/or user attribute information representing attributes of the user who has transmitted the content delivery request (e.g., the user's place of residence, age, gender, height, weight and/or occupation). In this case, the content delivery system 1 may be configured to transmit the user equipment position information stored in the core IMS part 30 to the media functions part 60.

Although in the embodiments described above, the content element information contained in the play-list information is composed of a combination of content identification information, and information on reproduction start position and reproduction end position of content identified by the content identification information, the play-list information may be composed only of the content identification information. In this case, the content data stored in the content data storage 62 is preferably data representing respective portions of content generated by dividing a single item of main content at positions where advertisement content is inserted.

Although in the embodiments described above the final priority level is calculated by combining a priority level represented by priority information contained in the user basic information and a priority level represented by priority information contained in the content basic information. Alternatively, the final priority level may be calculated by combining a value obtained by multiplying the priority level represented by the priority information contained in the user basic information by a first factor and a value obtained by multiplying the priority level represented by the priority information contained in the content basic information by a second factor.

Although in the embodiments above the advertisement attribute information associated with the advertisement content to be selected is composed only of a single item of advertisement attribute information (the calculated final priority level of which is the highest), the advertisement attribute information may be composed of a plurality of items of advertisement attribute information. In this case, each of the embodiments described above is preferably configured such that an item of advertisement attribute information associated with advertisement content the calculated final priority level of which is higher is selected with a higher priority.

In a modification of the embodiments above, a server may be provided having functions of both of the service control server 4a and the media server 4b, in place of the service control server 4a and the media server 4b.

Further, in a modification of the embodiments above, a server may be provided having functions of both of the service control server 4a and the user information management server 4c, in place of the service control server 4a and the user information management server 4c.

Although the media server 4b has the entire media functions part 60 in the embodiments described above, configuration may be such that a first server has part of the media functions part 60 (media control functions part) and a second server has the remaining part of the media functions part 60 (media delivery functions part).

In a modification of the embodiments above, a plurality of servers having the media delivery functions of the media functions part 60 may be provided.

Although the connection control system 3 includes a plurality of connection control servers (connection control servers 3a, 3b and so on) in the modification of the embodiments above, the connection control system 3 may include a single connection control server.

Although in the embodiments above the content delivery system 1 is configured to transmit the play-list information or the advertisement attribute information according to SIP, it may be configured to transmit according to another communication protocol (such as RTSP).

Although the user equipment 2 is a set-top box in the embodiments above, the user equipment 2 may be a cellphone, a PDA (Personal Data Assistance), a smartphone, a PHS (Personal Handyphone System), a game machine, car navigation equipment, a personal computer, or the like.

Further, although the content is video in the embodiments above, the content may be images only or audio only.

Although in the embodiments above the components of the content delivery system 1 is described as those forming the IMS (IP Multimedia Subsystem), they may be described as components forming a MMS (Multimedia Messaging Service).

INDUSTRIAL APPLICABILITY

The present invention is applicable to video-on-demand systems for content delivery via IP networks, and IPTV systems for TV broadcasting via IP networks.

The invention claimed is:

1. A content delivery system comprising an application server system and a connection control system,
the connection control system being configured to receive equipment specification information transmitted by user equipment and establish connection between the application server system and this user equipment with authenticating this user equipment based on the received equipment specification information,
the application server system comprising:
content storage unit for storing advertisement content data representing advertisement content and main content data representing main content;
delivery request reception unit for receiving, a content delivery request transmitted by the user equipment and containing main content identification information for identifying the main content;
advertisement content selection unit for selecting the stored advertisement content data based on selection information containing attribute information representing attributes of the advertisement content;
viewing content generation unit for generating, based on the selected advertisement content data and the main content data identified by the received content delivery request, viewing content data representing viewing content in which advertisement content represented by the advertisement content data is inserted in main content represented by the main content data; and
viewing content delivery unit for transmitting the generated viewing content data to the user equipment if connection with the user equipment which has transmitted the content delivery request is established by the connection control system; wherein
the content storage unit is configured to store the advertisement content data in association with attribute information representing attributes of advertisement content represented by the advertisement content data, and
the selection information contains user basic information that is information for specifying the attribute information and is information associated with user identification information for identifying a user of the user equipment, and
the advertisement content selection unit is configured to,
acquire the basic user information being prestored associated with the user identification information in the application server system, based on the user identification information for identifying the user of the user equipment received from the user equipment which has transmitted the content delivery request, wherein the user equipment authenticated by the connection control system, between which and the application server system, a connection is established, and
select advertisement content data stored in association with the attribute information specified by the user basic information; and the application server system further comprising:
a service control server and a media server;
the service control server comprises the delivery request reception unit and the advertisement content selection unit;
the media server comprises the viewing content generation unit and the viewing content delivery unit;
the service control server further comprises selected advertisement content specification information transmission unit for transmitting selected advertisement content specification information for specifying advertisement content data selected by the advertisement content selection unit to the media server via the connection control system;
the media server further comprises selected advertisement content specification information reception unit for receiving the selected advertisement content specification information transmitted by the service control server; and
the viewing content generation unit is configured to generate the viewing content data based on the advertisement content data specified by the received selected advertisement content specification information; and
the selected advertisement content specification information transmission unit is configured to transmit, to the media server via the connection control system, play-list information that is information containing the main content identification information contained in the content delivery request and the selected advertisement content specification information, and is information containing information indicating a sequence in which the main content identified by the main content identification information and the advertisement content specified by the selected advertisement content specification information are arranged in the viewing content; and
the media server is configured to switch a content according to a received play-list information; and
the selected advertisement content specification information transmission unit is configured to transmit the play-list information containing the selected advertisement content specification information to the media server via the connection control system when the connection control system executes a process for establishing the connection.

2. The content delivery system according to claim 1, wherein:
the content storage unit is configured to store the advertisement content data in association with attribute information representing attributes of the advertisement content represented by the advertisement content data;
the selection information contains content basic information that is information for specifying the attribute information and is information associated with the main content identification information for specifying the main content; and
the advertisement content selection unit is configured to select advertisement content data stored in association with the attribute information specified by the content basic information associated with the main content identification information contained in the received content delivery request.

3. The content delivery system according to claim 1, wherein:
the connection control system is configured to establish the connection by exchanging a predetermined connection establishment message with each of the service control server and the media server; and
the selected advertisement content specification information transmission unit is configured to transmit the selected advertisement content specification information to the media server via the connection control system by incorporating the selected advertisement content specification information in the connection establishment message.

4. A content delivery system comprising an application server system and a connection control system,
the connection control system comprising a core IMS (Internet Protocol Multimedia Subsystem) part for receiving equipment specification information transmitted by user equipment and establishing connection between the application server system and the user equipment with authenticating this user equipment based on the received equipment specification information,
the application server system comprising:
a media functions part for transmitting content data representing content to the user equipment with which connection is established by the connection control system;
a service control functions part for controlling services provided by the media functions part; and
a user profile server functions part for storing profile information of a user of the user equipment,
the application server system further comprising:
content storage unit for storing advertisement content data representing advertisement content and main content data representing main content; and
advertisement content selection unit for selecting the stored advertisement content data based on selection information containing attribute information representing attributes of the advertisement content and preliminarily stored by the user profile server functions part, the service control functions part or the connection control system,
the service control functions part comprising delivery request reception unit for receiving, a content delivery request containing main content identification information for identifying the main content and transmitted by the user equipment,
the media functions part comprising:
viewing content generation unit for generating, based on the selected advertisement content data and main content data identified by the received content delivery request, viewing content data representing viewing content in which advertisement content represented by the advertisement content data is inserted in main content represented by the main content data; and
viewing content delivery unit for transmitting the generated viewing content data to the user equipment if connection with the user equipment which has transmitted the content delivery request is established by the core IMS part; wherein
the content storage unit is configured to store the advertisement content data in association with attribute information representing attributes of advertisement content represented by the advertisement content data, and
the selection information contains user basic information that is information for specifying the attribute information and is information associated with user identification information for identifying a user of the user equipment, and
the advertisement content selection unit is configured to,
acquire the basic user information being prestored associated with the user identification information in the application server system, based on the user identification information for identifying the user of the user equipment received from the user equipment which has transmitted the content delivery request, wherein the user equipment authenticated by the connection control system, between which and the application server system, a connection is established, and
select advertisement content data stored in association with the attribute information specified by the user basic information; and the application server system further comprising:
a service control server and a media server;

the service control server comprises the delivery request reception unit and the advertisement content selection unit;

the media server comprises the viewing content generation unit and the viewing content delivery unit;

the service control server further comprises selected advertisement content specification information transmission unit for transmitting selected advertisement content specification information for specifying advertisement content data selected by the advertisement content selection unit to the media server via the connection control system;

the media server further comprises selected advertisement content specification information reception unit for receiving the selected advertisement content specification information transmitted by the service control server; and the viewing content generation unit is configured to generate the viewing content data based on the advertisement content data specified by the received selected advertisement content specification information; and the selected advertisement content specification information transmission unit is configured to transmit, to the media server via the connection control system, play-list information that is information containing the main content identification information contained in the content delivery request and the selected advertisement content specification information, and is information containing information indicating a sequence in which the main content identified by the main content identification information and the advertisement content specified by the selected advertisement content specification information are arranged in the viewing content; and the media server is configured to switch a content according to a received play-list information; and the selected advertisement content specification information transmission unit is configured to transmit the play-list information containing the selected advertisement content specification information to the media server via the connection control system when the connection control system executes a process for establishing the connection.

5. A content delivery method comprising:

receiving equipment specification information transmitted by user equipment and establishing connection between an application server system and the user equipment with authenticating this user equipment based on the received equipment specification information, by a connection control system;

storing advertisement content data representing advertisement content and main content data representing main content in a storing device;

receiving, a content delivery request containing main content identification information for identifying the main content and transmitted by the user equipment, by the application server system;

selecting the stored advertisement content data based on selection information containing attribute information representing attributes of the advertisement content;

generating, based on the selected advertisement content data and the main content data identified by the received content delivery request, viewing content data representing viewing content in which advertisement content represented by the advertisement content data is inserted in main content represented by the main content data; and transmitting the generated viewing content data to the user equipment if connection with the user equipment which has transmitted the content delivery request is established by the connection control system, by the application server system; wherein the advertisement content data is stored in association with attribute information representing attributes of advertisement content represented by the advertisement content data in the storage device, and the selection information contains user basic information that is information for specifying the attribute information and is information associated with user identification information for identifying a user of the user equipment, and the content delivery method further configured to, when selecting the advertising content data, acquire the basic user information being prestored associated with the user identification information in the application server system, based on the user identification information for identifying the user of the user equipment received from the user equipment which has transmitted the content delivery request, wherein the user equipment authenticated by the connection control system, between which and the application server system, a connection is established, and select advertisement content data stored in association with the attribute information specified by the user basic information; and the application server system further comprising:

a service control server and a media server;

the service control server comprises a delivery request reception unit and a advertisement content selection unit;

the media server comprises a viewing content generation unit and a viewing content delivery unit;

the service control server further comprises selected advertisement content specification information transmission unit for transmitting selected advertisement content specification information for specifying advertisement content data selected by the advertisement content selection unit to the media server via the connection control system;

the media server further comprises selected advertisement content specification information reception unit for receiving the selected advertisement content specification information transmitted by the service control server; and the viewing content generation unit is configured to generate the viewing content data based on the advertisement content data specified by the received selected advertisement content specification information; and the selected advertisement content specification information transmission unit is configured to transmit, to the media server via the connection control system, play-list information that is information containing the main content identification information contained in the content delivery request and the selected advertisement content specification information, and is information containing information indicating a sequence in which the main content identified by the main content identification information and the advertisement content specified by the selected advertisement content specification information are arranged in the viewing content; and the media server is configured to switch a content according to a received play-list information; and the selected advertisement content specification information transmission unit is configured to transmit the playlist information containing the selected advertisement content specification information to the media server via the connection control system when the connection control system executes a process for establishing the connection.

6. A non transitory computer-readable medium storing a program comprising instructions for causing a service control server to realize:
  delivery request reception unit for receiving a content delivery request containing main content identification information for identifying main content and transmitted by user equipment which is authenticated by a connection control system and establishing connection between a media server;
  advertisement content selection unit for selecting advertisement content data preliminarily stored in a storing device based on selection information containing attribute information representing attributes of advertisement content; and
  selected advertisement content specification information transmission unit for transmitting selected advertisement content specification information specifying the advertisement content data selected by the advertisement content selection unit to the media server via the connection control system when the connection control system executes a process for establishing the connection; wherein
  the storage unit is configured to store the advertisement content data in association with attribute information representing attributes of advertisement content represented by the advertisement content data, and
  the selection information contains user basic information that is information for specifying the attribute information and is information associated with user identification information for identifying a user of the user equipment, and
  the advertisement content selection unit is configured to,
  acquire the basic user information being prestored associated with the user identification information in the application server system, based on the user identification information for identifying the user of the user equipment received from the user equipment which has transmitted the content delivery request, wherein the user equipment authenticated by the connection control system, between which and the application server system, a connection is established, and
    select advertisement content data stored in association with the attribute information specified by the user basic information; and the application server system further comprising:
  a service control server and a media server;
  the service control server comprises the delivery request reception unit and the advertisement content selection unit;
  the media server comprises the viewing content generation unit and the viewing content delivery unit;
  the service control server further comprises selected advertisement content specification information transmission unit for transmitting selected advertisement content specification information for specifying advertisement content data selected by the advertisement content selection unit to the media server via the connection control system;
  the media server further comprises selected advertisement content specification information reception unit for receiving the selected advertisement content specification information transmitted by the service control server; and
  the viewing content generation unit is configured to generate the viewing content data based on the advertisement content data specified by the received selected advertisement content specification information; and
  the selected advertisement content specification information transmission unit is configured to transmit, to the media server via the connection control system, play-list information that is information containing the main content identification information contained in the content delivery request and the selected advertisement content specification information, and is information containing information indicating a sequence in which the main content identified by the main content identification information and the advertisement content specified by the selected advertisement content specification information are arranged in the viewing content; and
  the media server is configured to switch a content according to a received play-list information; and
  the selected advertisement content specification information transmission unit is configured to transmit the play-list information containing the selected advertisement content specification information to the media server via the connection control system when the connection control system executes a process for establishing the connection.

7. The non transitory computer-readable medium according to claim 6, wherein the selected advertisement content specification information transmission unit is configured to transmit, to the media server via the connection control system, play-list information which is information containing the main content identification information contained in the content delivery request and the selected advertisement content specification information, and is information containing information indicating a sequence in which the main content identified by the main content identification information and the advertisement content specified by the selected advertisement content specification information are arranged in the viewing content.

8. A content delivery system comprising an application server system and a connection control system,
  the connection control system being configured to receive equipment specification information transmitted by user equipment and establish connection between the application server system and this user equipment with authenticating this user equipment based on the received equipment specification information,
  the application server system comprising:
    content storage means for storing advertisement content data representing advertisement content and main content data representing main content;
    delivery request reception means for receiving, a content delivery request transmitted by the user equipment and containing main content identification information for identifying the main content;
    advertisement content selection means for selecting the stored advertisement content data based on selection information containing attribute information representing attributes of the advertisement content;
    viewing content generation means for generating, based on the selected advertisement content data and the main content data identified by the received content delivery request, viewing content data representing viewing content in which advertisement content represented by the advertisement content data is inserted in main content represented by the main content; and viewing content delivery means for transmitting the generated viewing content data to the user equipment if connection with the user equipment which has transmitted the content delivery request is established by the connection control system; wherein the content storage means is configured to store the advertisement content data in association with attribute information representing attributes of advertisement content represented by the advertisement content data, and the selection information contains user basic information that is information for specifying the attribute information and is information associated with user identification information for identifying a user of the user equipment, and the advertisement content selection means is configured to, acquire the basic user information being prestored associated with the user identification information in the application server system, based on the user identification information for identifying the user of the user equipment received from the user equipment which has transmitted the content delivery request, wherein the user equipment authenticated by the connection control system, between which and the application server system, a connection is established, and select advertisement content data stored in association with the attribute information specified by the user basic information; and the application server system further comprising:

a service control server and a media server;

the service control server comprises the delivery request reception means and the advertisement content selection means;

the media server comprises the viewing content generation means and the viewing content delivery means;

the service control server further comprises selected advertisement content specification information transmission means for transmitting selected advertisement content specification information for specifying advertisement content data selected by the advertisement content selection means to the media server via the connection control system;

the media server further comprises selected advertisement content specification information reception means for receiving the selected advertisement content specification information transmitted by the service control server; and the viewing content generation means is configured to generate the viewing content data based on the advertisement content data specified by the received selected advertisement content specification information; and the selected advertisement content specification information transmission means is configured to transmit, to the media server via the connection control system, play-list information that is information containing the main content identification information contained in the content delivery request and the selected advertisement content specification information, and is information containing information indicating a sequence in which the main content identified by the main content identification information and the advertisement content specified by the selected advertisement content specification information are arranged in the viewing content; and the media server is configured to switch a content according to a received play-list information; and the selected advertisement content specification information transmission means is configured to transmit the play-list information containing the selected advertisement content specification information to the media server via the connection control system when the connection control system executes a process for establishing the connection.

9. A content delivery system comprising an application server system and a connection control system, the connection control system comprising a core IMS (Internet Protocol Multimedia Subsystem) part for receiving equipment specification information transmitted by user equipment and establishing connection between the application server system and the user equipment with authenticating this user equipment based on the received equipment specification information, the application server system comprising:

a media functions part for transmitting content data representing content to the user equipment with which connection is established by the connection control system;

a service control functions part for controlling services provided by the media functions part; and a user profile server functions part for storing profile information of a user of the user equipment, the application server system further comprising:

content storage means for storing advertisement content data representing advertisement content and main content data representing main content; and advertisement content selection means for selecting the stored advertisement content data based on selection information containing attribute information representing attributes of the advertisement content and preliminarily stored by the user profile server functions part, the service control functions part or the connection control system, the service control functions part comprising delivery request reception means for receiving, a content delivery request containing main content identification information for identifying the main content and transmitted by the user equipment, the media functions part comprising:

viewing content generation means for generating, based on the selected advertisement content data and main content data identified by the received content delivery request, viewing content data representing viewing content in which advertisement content represented by the advertisement content data is inserted in main content represented by the main content data; and viewing content delivery means for transmitting the generated viewing content data to the user equipment if connection with the user equipment which has transmitted the content delivery request is established by the core IMS part; wherein the content storage means is configured to store the advertisement content data in association with attribute information representing attributes of advertisement content represented by the advertisement content data, and the selection information contains user basic information that is information for specifying the attribute information and is information associated with user identification information for identifying a user of the user equipment, and the advertisement content selection means is configured to, acquire the basic user information being prestored associated with the user identification information in the application server system, based on the user identification information for identifying the user of the user equipment received from the user equipment which has transmitted the content delivery request, wherein the user equipment authenticated by the connection control system, between which and the application server system, a connection is established, and
select advertisement content data stored in association with the attribute information specified by the user basic information; and the application server system further comprising:
a service control server and a media server;
the service control server comprises the delivery request reception unit and the advertisement content selection unit;
the media server comprises the viewing content generation unit and the viewing content delivery unit;
the service control server further comprises selected advertisement content specification information transmission unit for transmitting selected advertisement content specification information for specifying advertisement content data selected by the advertisement content selection unit to the media server via the connection control system;
the media server further comprises selected advertisement content specification information reception unit for receiving the selected advertisement content specification information transmitted by the service control server; and
the viewing content generation unit is configured to generate the viewing content data based on the advertisement content data specified by the received selected advertisement content specification information; and
the selected advertisement content specification information transmission unit is configured to transmit, to the media server via the connection control system, play-list information that is information containing the main content identification information contained in the content delivery request and the selected advertisement content specification information, and is information containing information indicating a sequence in which the main content identified by the main content identification information and the advertisement content specified by the selected advertisement content specification information are arranged in the viewing content; and
the media server is configured to switch a content according to a received play-list information; and
the selected advertisement content specification information transmission unit is configured to transmit the play-list information containing the selected advertisement content specification information to the media server via the connection control system when the connection control system executes a process for establishing the connection.

10. A content delivery system comprising an application server system and a connection control system,
the connection control system being configured to receive equipment specification information transmitted by user equipment and establish connection between the application server system and this user equipment with authenticating this user equipment based on the received equipment specification information,
the application server system comprising:
content storage unit for storing advertisement content data representing advertisement content and main content data representing main content;
delivery request reception unit for receiving, a content delivery request transmitted by the user equipment and containing main content identification information for identifying the main content;
advertisement content selection unit for selecting the stored advertisement content data based on selection information containing attribute information representing attributes of the advertisement content;
viewing content generation unit for generating, based on the selected advertisement content data and the main content data identified by the received content delivery request, viewing content data representing viewing content in which advertisement content represented by the advertisement content data is inserted in main content represented by the main content data; and
viewing content delivery unit for transmitting the generated viewing content data to the user equipment; wherein
the content storage unit is configured to store the advertisement content data in association with attribute information representing attributes of advertisement content represented by the advertisement content data, and
the selection information contains user basic information that is information for specifying the attribute information and is information associated with user identification information for identifying a user of the user equipment, and
the advertisement content selection unit is configured to,
acquire the basic user information being prestored associated with the user identification information in the application server system, based on the user identification information for identifying the user of the user equipment received from the user equipment which has transmitted the content delivery request, wherein the user equipment authenticated by the connection control system, between which and the application server system, a connection is established, and
select advertisement content data stored in association with the attribute information specified by the user basic information; and the application server system further comprising:
a service control server and a media server;
the service control server comprises the delivery request reception unit and the advertisement content selection unit;
the media server comprises the viewing content generation unit and the viewing content delivery unit;
the service control server further comprises selected advertisement content specification information transmission unit for transmitting selected advertisement content specification information for specifying advertisement content data selected by the advertisement content selection unit to the media server via the connection control system;
the media server further comprises selected advertisement content specification information reception unit for receiving the selected advertisement content specification information transmitted by the service control server; and
the viewing content generation unit is configured to generate the viewing content data based on the advertisement content data specified by the received selected advertisement content specification information; and
the selected advertisement content specification information transmission unit is configured to transmit, to the media server via the connection control system, play-list information that is information containing the main content identification information contained in the content delivery request and the selected advertisement content specification information, and is information containing information indicating a sequence in which the main content identified by the main content identification information and the advertisement content specified by the selected advertisement content specification information are arranged in the viewing content; and the media server is configured to switch a content according to a received play-list information; and the selected advertisement content specification information transmission unit is configured to transmit the play-list information containing the selected advertisement content specification information to the media server via the connection control system when the connection control system executes a process for establishing the connection.

11. A content delivery system comprising an application server system and a connection control system, the connection control system being configured to receive equipment specification information transmitted by user equipment and establish connection between the application server system and this user equipment with authenticating this user equipment based on the received equipment specification information, the application server system comprising:

content storage unit for storing advertisement content data representing advertisement content and main content data representing main content;

delivery request reception unit for receiving, a content delivery request transmitted by the user equipment and containing main content identification information for identifying the main content;

advertisement content selection unit for selecting the stored advertisement content data based on selection information containing attribute information representing attributes of the advertisement content;

viewing content generation unit for generating, based on the selected advertisement content data and the main content data identified by the received content delivery request, viewing content data representing viewing content in which advertisement content represented by the advertisement content data is inserted in main content represented by the main content data; and viewing content delivery unit for transmitting the generated viewing content data to the user equipment if connection with the user equipment which has transmitted the content delivery request is established by the connection control system; wherein the content storage unit is configured to store the advertisement content data in association with attribute information representing attributes of advertisement content represented by the advertisement content data, and the selection information contains user basic information that is information for specifying the attribute information and is information associated with user identification information for identifying a user of the user equipment, and the advertisement content selection unit is configured to, acquire the basic user information being prestored associated with the user identification information in the application server system, based on the user identification information for identifying the user of the user equipment received from the user equipment which has transmitted the content delivery request, wherein the user equipment authenticated by the connection control system, between which and the application server system, a connection is established, and select advertisement content data stored in association with the attribute information specified by the user basic information, and the application server system generates:

the viewing content data, by the viewing content generation unit, based on the advertisement content data which is specified by selected advertisement content specification information selected by the advertisement content selection unit; and the play-list information that is information containing the main content identification information contained in the content delivery request and the selected advertisement content specification information, and is information containing information indicating a sequence in which the main content identified by the main content identification information; and the application server system further comprising:

a service control server and a media server;

the service control server comprises the delivery request reception unit and the advertisement content selection unit;

the media server comprises the viewing content generation unit and the viewing content delivery unit;

the service control server further comprises selected advertisement content specification information transmission unit for transmitting selected advertisement content specification information for specifying advertisement content data selected by the advertisement content selection unit to the media server via the connection control system;

the media server further comprises selected advertisement content specification information reception unit for receiving the selected advertisement content specification information transmitted by the service control server; and the viewing content generation unit is configured to generate the viewing content data based on the advertisement content data specified by the received selected advertisement content specification information; and the selected advertisement content specification information transmission unit is configured to transmit, to the media server via the connection control system, play-list information that is information containing the main content identification information contained in the content delivery request and the selected advertisement content specification information, and is information containing information indicating a sequence in which the main content identified by the main content identification information and the advertisement content specified by the selected advertisement content specification information are arranged in the viewing content; and the media server is configured to switch a content according to a received play-list information; and the selected advertisement content specification information transmission unit is configured to transmit the play-list information containing the selected advertisement content specification information to the media server via the connection control system when the connection control system executes a process for establishing the connection.

12. The content delivery system according to claim 11, wherein the application server system is equipped with at least the service control functions part for controlling services being provided with the user equipment, and generates the playlist by other functions part being different from the service control functions part.

13. The content delivery system according to claim 11, wherein the application server system comprising:
the media functions part for transmitting content data representing content to the user equipment with which connection is established by the connection control system;
the service control functions part for controlling services provided by the media functions part; and
the media functions part generates the playlist.

* * * * *